(12) United States Patent
Murakami et al.

(10) Patent No.: US 10,265,864 B2
(45) Date of Patent: Apr. 23, 2019

(54) WORKPIECE REVERSE SUPPORT DEVICE AND ROBOT CELL INCLUDING THE SAME DEVICE

(71) Applicant: KAWASAKI JUKOGYO KABUSHIKI KAISHA, Kobe-shi, Hyogo (JP)

(72) Inventors: Junichi Murakami, Kobe (JP); Kenji Bando, Nishinomiya (JP); Shuhei Kuraoka, Akashi (JP); Yukio Iwasaki, Kobe (JP); Takayuki Yoshimura, Kakogawa (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/103,537

(22) PCT Filed: Dec. 9, 2014

(86) PCT No.: PCT/JP2014/082501
§ 371 (c)(1),
(2) Date: Jun. 10, 2016

(87) PCT Pub. No.: WO2015/087855
PCT Pub. Date: Jun. 18, 2015

(65) Prior Publication Data
US 2016/0318191 A1    Nov. 3, 2016

(30) Foreign Application Priority Data

Dec. 10, 2013 (JP) ................. 2013-254774

(51) Int. Cl.
*B25J 15/02* (2006.01)
*B25J 15/06* (2006.01)
(Continued)

(52) U.S. Cl.
CPC ......... *B25J 15/0253* (2013.01); *B24B 21/008* (2013.01); *B24B 41/005* (2013.01);
(Continued)

(58) Field of Classification Search
CPC ...................................................... B25J 15/0253
(Continued)

(56) References Cited

U.S. PATENT DOCUMENTS

| 3,241,687 A | * | 3/1966 | Orloff | ............. B25J 5/00 212/278 |
| 4,648,783 A | * | 3/1987 | Tan | ............. B25J 9/14 414/730 |

(Continued)

FOREIGN PATENT DOCUMENTS

| JP | H03-184796 A | 8/1991 |
| JP | H09-29679 A | 2/1997 |

(Continued)

OTHER PUBLICATIONS

Mar. 10, 2015 International Search Report issued in International Patent Application No. PCT/JP2014/082501.
(Continued)

*Primary Examiner* — Paul T Chin
(74) *Attorney, Agent, or Firm* — Oliff PLC

(57) ABSTRACT

A workpiece reverse support device has a pair of workpiece pinching members for abutting on their respective opposing side portions of the workpiece held by the robot hand so as to pinch the workpiece and a pinching state switching unit for switching the pair of workpiece pinching members between a pinching state of pinching the workpiece and a releasing state of releasing the workpiece. In a workpiece reverse support device for supporting a face/back reverse of
(Continued)

a workpiece in a robot hand, flexibility of its installation state, namely installation location, installation posture, or the like can be enhanced.

4 Claims, 26 Drawing Sheets

(51) Int. Cl.
    *B25J 9/00*          (2006.01)
    *B24B 21/00*       (2006.01)
    *B24B 41/00*       (2006.01)
    *B25J 21/00*       (2006.01)

(52) U.S. Cl.
    CPC ........... *B25J 9/0018* (2013.01); *B25J 9/0096* (2013.01); *B25J 15/0616* (2013.01); *B25J 21/00* (2013.01)

(58) Field of Classification Search
    USPC ... 294/86.4, 902, 103.1, 197, 198, 212, 213; 901/39
    See application file for complete search history.

(56) References Cited

U.S. PATENT DOCUMENTS

| | | | | |
|---|---|---|---|---|
| 4,726,732 A * | 2/1988 | Kato | .................. | B25J 5/02 212/196 |
| 5,132,914 A * | 7/1992 | Cahlander | .............. | A47J 27/14 700/112 |
| 5,518,542 A | 5/1996 | Matsukawa et al. | | |
| 6,261,160 B1 | 7/2001 | Hakomori | | |
| 6,499,779 B2 * | 12/2002 | Thies | ...................... | B66D 1/12 294/67.1 |
| 6,678,583 B2 * | 1/2004 | Nasr | ....................... | B25J 9/046 206/710 |
| 6,772,493 B2 * | 8/2004 | Yamanashi | ............. | B23Q 1/66 269/309 |
| 8,025,277 B2 * | 9/2011 | Lin | ...................... | B25J 15/0061 269/21 |
| 9,317,749 B2 * | 4/2016 | Inazumi | ............... | G06K 9/00664 |
| 2002/0193909 A1 * | 12/2002 | Parker | .................... | B25J 19/023 700/259 |
| 2005/0199470 A1 * | 9/2005 | Buchi | .................... | B65G 27/32 198/434 |
| 2008/0199283 A1 | 8/2008 | Mitsuyoshi | | |
| 2013/0017050 A1 * | 1/2013 | Fukudome | ........... | B25J 17/0266 414/729 |
| 2013/0086801 A1 * | 4/2013 | Mimura | .................. | B23P 21/00 29/720 |
| 2013/0293410 A1 * | 11/2013 | Hieronimi | ............... | G01S 13/74 342/190 |
| 2014/0055597 A1 * | 2/2014 | Kim | ....................... | B25J 19/023 348/82 |
| 2014/0271061 A1 * | 9/2014 | Fukuda | .................... | B23Q 7/14 414/226.05 |
| 2014/0277715 A1 * | 9/2014 | Nagai | .................... | B25J 9/0084 700/248 |
| 2016/0318180 A1 * | 11/2016 | Miyasaka | ................ | B25J 9/047 |
| 2016/0325400 A1 * | 11/2016 | Murakami | ............... | B25J 21/00 |
| 2016/0325439 A1 * | 11/2016 | Murakami | ............. | B25J 15/009 |

FOREIGN PATENT DOCUMENTS

| | | |
|---|---|---|
| JP | 2002-213570 A | 7/2002 |
| JP | 2007-021634 A | 2/2007 |
| JP | 2008-213130 A | 9/2008 |
| KR | 2007-0045534 A | 5/2007 |

OTHER PUBLICATIONS

Jun. 14, 2016 International Preliminary Report on Patentability issued in International Patent Application No. PCT/JP2014/082501.
Jan. 15, 2018 Search Report issued in European Patent Application No. 14870400.0.

* cited by examiner

WORKPIECE REVERSE SUPPORT DEVICE AND ROBOT CELL INCLUDING THE SAME DEVICE

TECHNICAL FIELD

The present invention relates to a workpiece reverse support device for supporting face/back reverse of a workpiece in a robot hand, and a robot cell including the same device.

BACKGROUND ART

Conventionally, an industrial robot is known, which holds a workpiece with a robot hand and conveys the same. Typically, an articulated robot is given as its example.

In the articulated robot, a plurality of arm members are connected to each other in order via joints so as to configure a robot arm, and a robot hand is mounted to a distal end of the robot arm.

The articulated robot, typically a six-axis articulated robot, has a high degree of freedom in movement of the robot hand mounted to the distal end of the robot arm.

Recently, a robot cell is employed more and more as a self-supporting production facility, and the articulated robot is advantageous for working in the robot cell of a limited space.

However, particularly when a work space is limited like the robot cell, there is a problem that the arrangement of a robot and various instruments and structures around the same are difficult to be designed, and therefore it is required to improve space efficiency.

For example, when a workpiece which has once been held by the robot hand needs to be reheld reversing its face and back, an apparatus for that needs to be installed inside of the robot cell.

Patent Literature 1 discloses a workpiece reverse station as an apparatus for reversing a workpiece which has once been held by a robot hand face/back so as to rehold the same.

CITATION LIST

Patent Document

[Patent Literature 1] Japanese Patent Application Laid-Open No. 2007-21634

SUMMARY OF INVENTION

Technical Problem

However, as the workpiece reverse station in Patent Literature 1 has a structure that a workpiece is simply placed on a horizontal frame, the workpiece is not fixed upon a reverse operation.

Therefore, the workpiece upon the reverse operation needs to be placed on the workpiece reverse station in the state that the workpiece extends in the horizontal direction, and the direction of the workpiece upon the reverse operation is limited.

Also, as the workpiece reverse station in Patent Literature 1 is installed on the floor surface, there is a problem that it occupies a large part of the floor surface together with other apparatuses (carry-in station, processing station, and carry-out station), and the installation area (footprint) of the apparatuses becomes large.

Then, an object of the present invention is, in a workpiece reverse support device for supporting a face/back reverse of a workpiece in a robot hand, to enhance flexibility of its installation state, namely installation location, installation posture, or the like.

Solution to Problem

In order to achieve the objects above, the present invention is a workpiece reverse support device for supporting a face/back reverse of a workpiece in a robot hand, comprising a pair of workpiece pinching members for abutting on their respective opposing side portions of the workpiece held by the robot hand so as to pinch the workpiece, and a pinching state switching unit for switching the pair of workpiece pinching members between a pinching state of pinching the workpiece and a releasing state of releasing the workpiece.

Also, it is preferable that the workpiece reverse support device is installed inside of a robot cell in which a robot having the robot hand is arranged.

Also, it is preferable that the pair of workpiece pinching members pinch the workpiece so that the workpiece is substantially orthogonal to any one of inner wall surfaces of the robot cell.

Also, it is preferable that the pair of workpiece pinching members pinch the workpiece so that the workpiece is substantially orthogonal to a ceiling surface of the robot cell.

Also, it is preferable that the pair of workpiece pinching members are installed on the ceiling surface of the robot cell.

Also, it is preferable that the pair of workpiece pinching members pinch the workpiece so that the robot is positioned on a pinching direction axis line of the workpiece.

Also, it is preferable that the pair of workpiece pinching members have a fixed workpiece pinching member and a movable workpiece pinching member, the pinching state switching unit switching a position of the movable workpiece pinching member between a position in the pinching state and a position in the releasing state.

Also, it is preferable that the pinching state switching unit has a fluid pressure cylinder including a piston on which the movable workpiece pinching member is mounted and a cylinder moving unit for moving the fluid pressure cylinder in a reciprocating direction of the piston.

In order to achieve the objects above, the present invention comprises, in a robot cell for processing a workpiece, any one of the workpiece reverse support devices and a cell skeleton inside which the workpiece reverse support device is installed.

Advantageous Effect of Invention

According to the present invention, in a workpiece reverse support device for supporting a face/back reverse of a workpiece in a robot hand, flexibility of its installation state, namely installation location, installation posture, or the like can be enhanced.

DESCRIPTION OF EMBODIMENTS

Figure 1:
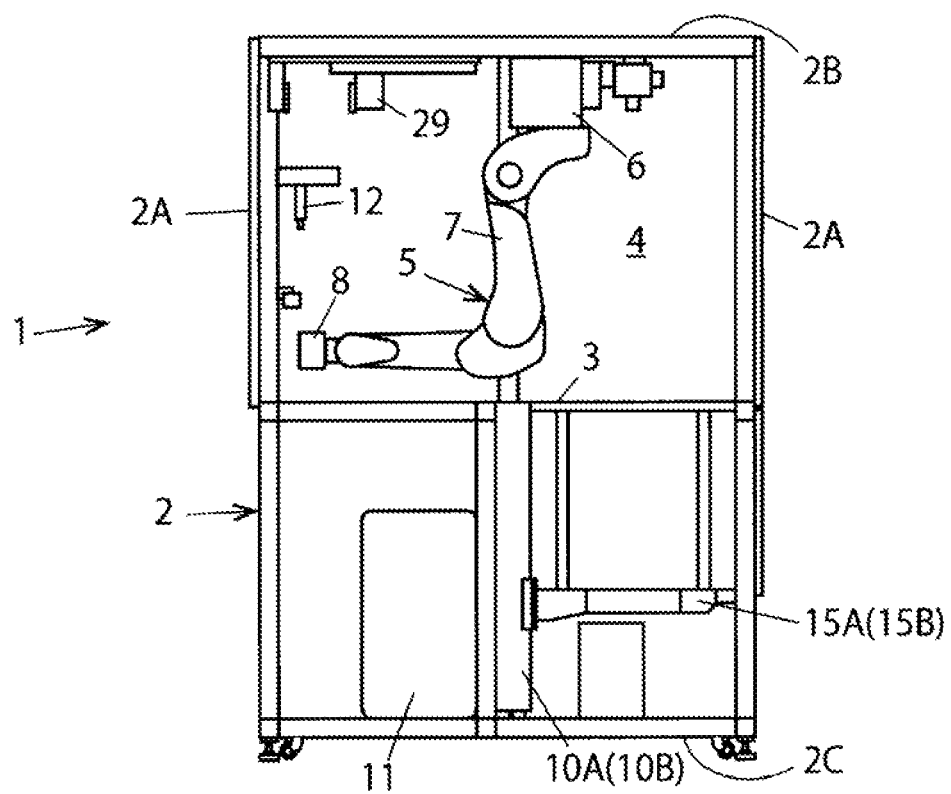
FIG. 1 illustrates the inside of a robot cell according to an embodiment of the present invention viewed from the side.

Hereunder, a robot cell according to an embodiment of the present invention will be described referring to the figures.

The robot cell according to the embodiment is to carry out a grinding process on a workpiece. The workpiece to be processed is typically a substantially flat workpiece, a workpiece with a short side wall rising from (part of) a side edge of the flat plate, or the like. Material of the workpiece may be magnetic or non-magnetic, and typically it is a non-magnetic metal such as aluminum alloy or magnesium alloy.

As illustrated in FIG. 1 to FIG. 4, the robot cell 1 comprises a cell skeleton 2 generally formed of a rectangular parallelepiped, and the cell skeleton 2 has four side walls 2A, a ceiling 2B arranged to the upper ends of the side walls 2A, and a bottom wall 2C arranged to the lower ends of the side walls 2A.

A horizontal work table 3 extending in the horizontal direction is provided in the center portion in the vertical direction inside of the cell skeleton 1, and a work space 4 is formed above the horizontal work table 3.

A six-axis articulated robot 5 is arranged inside of the robot cell 1 and suspended from the ceiling. The robot 5 comprises a base portion 6 fixed to the ceiling 2B of the cell skeleton 2, a robot arm 7 whose proximal end portion is connected to the base portion 6, and a robot hand 8 mounted on a distal end of the robot arm 7.

Figure 4:
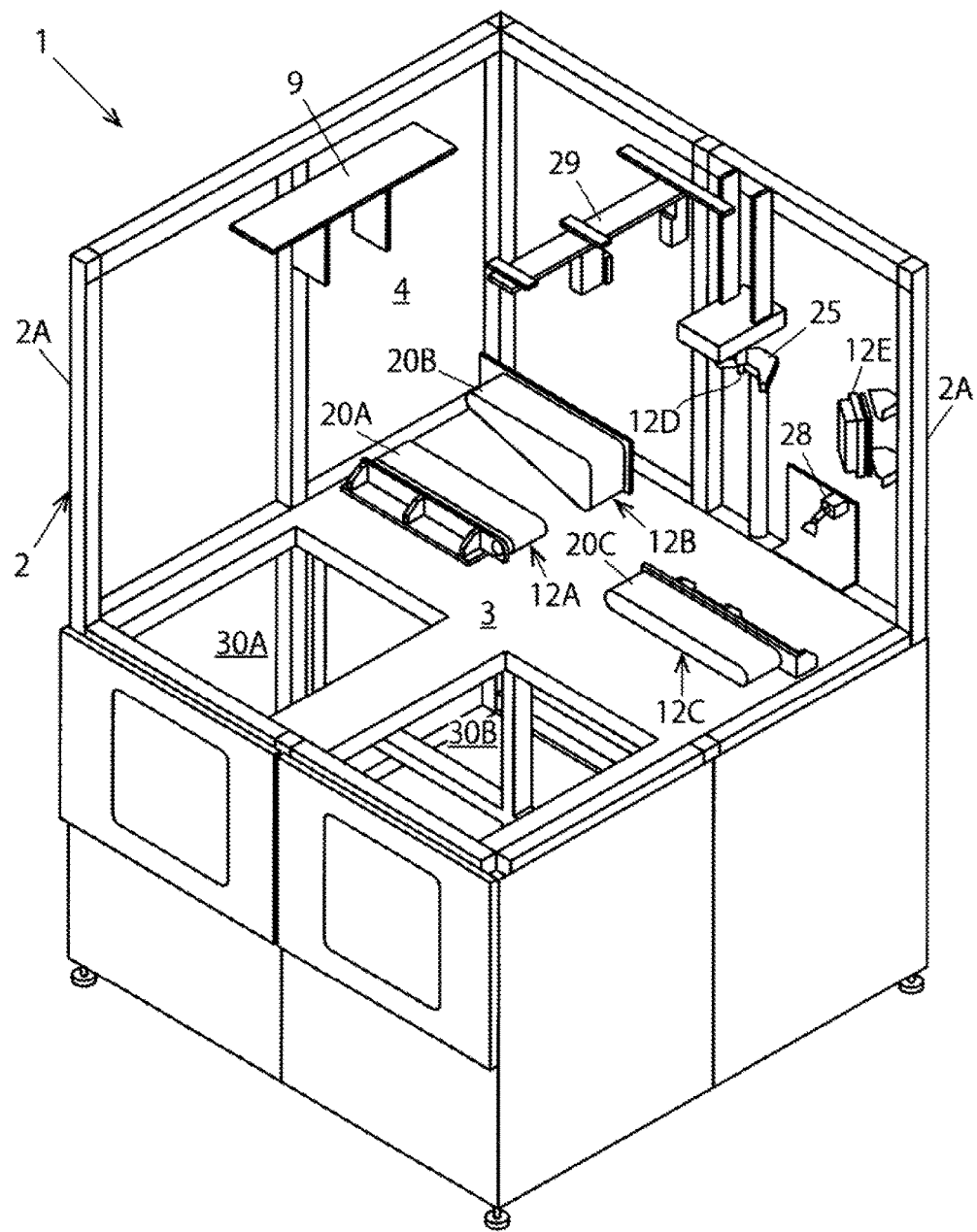
FIG. 4 illustrates the inside of the robot cell in FIG. 1 viewed from obliquely above.

Plural kinds of robot hands 8 are previously provided in order to be used for different purposes in accordance to the use, and the robot hand 8 is mounted detachably on the distal end of the robot arm 7. The non-used robot hands 8 are placed on a hand placing table 9 (FIG. 4).

As illustrated in FIG. 1, a tray elevating/lowering device 10A, 10B on a supply side and a discharge side and a control device 11 are arranged below the horizontal work table 3. The robot 5, a processing device 12 (FIG. 3, FIG. 4), the tray elevating/lowering device 10A, 10B, or the like is controlled by the control device 11.

The supply side tray elevating/lowering device 10A has a supply side elevating/lowering portion 15A which elevates a plurality of trays 14 each storing workpieces 13 before processing in order, and the discharge side tray elevating/lowering device 10B has a discharge side elevating/lowering portion 15B which lowers a plurality of trays 14 each storing the workpieces 13 after processing in order.

A plurality of workpieces 13 (eight pieces in FIG. 3) are stored in one tray 14, and a plurality of trays 14 are set to the supply side elevating/lowering portion 15A and the discharge side elevating/lowering portion 15B respectively in a state of stacking vertically.

Figure 2:
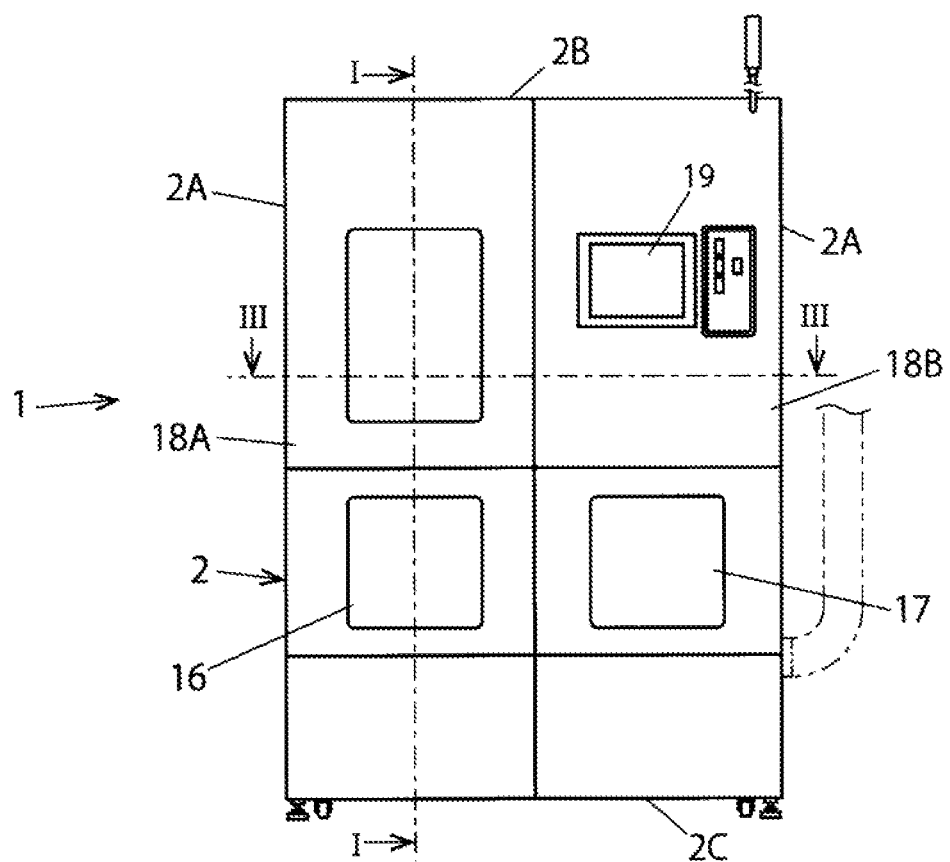
FIG. 2 is a front view of the robot cell in FIG. 1.

As illustrated in FIG. 2, a carry-in door 16 for carrying the trays 14 storing the workpieces 13 before processing into the robot cell 1 and a carry-out door 17 for carrying the trays 14 storing the workpieces 13 after processing out from the inside of the robot cell 1 are provided in front of the cell skeleton 2.

A pair of work doors 18A, 18B opened in maintenance so as to enable access to the inside of the robot cell 1 are provided above the carry-in door 16 and the carry-out door 17 in front of the cell skeleton 2. An operation panel 19 of the robot cell 1 is provided to one work door 18A of the pair of work doors 18A, 18B.

Figure 3:
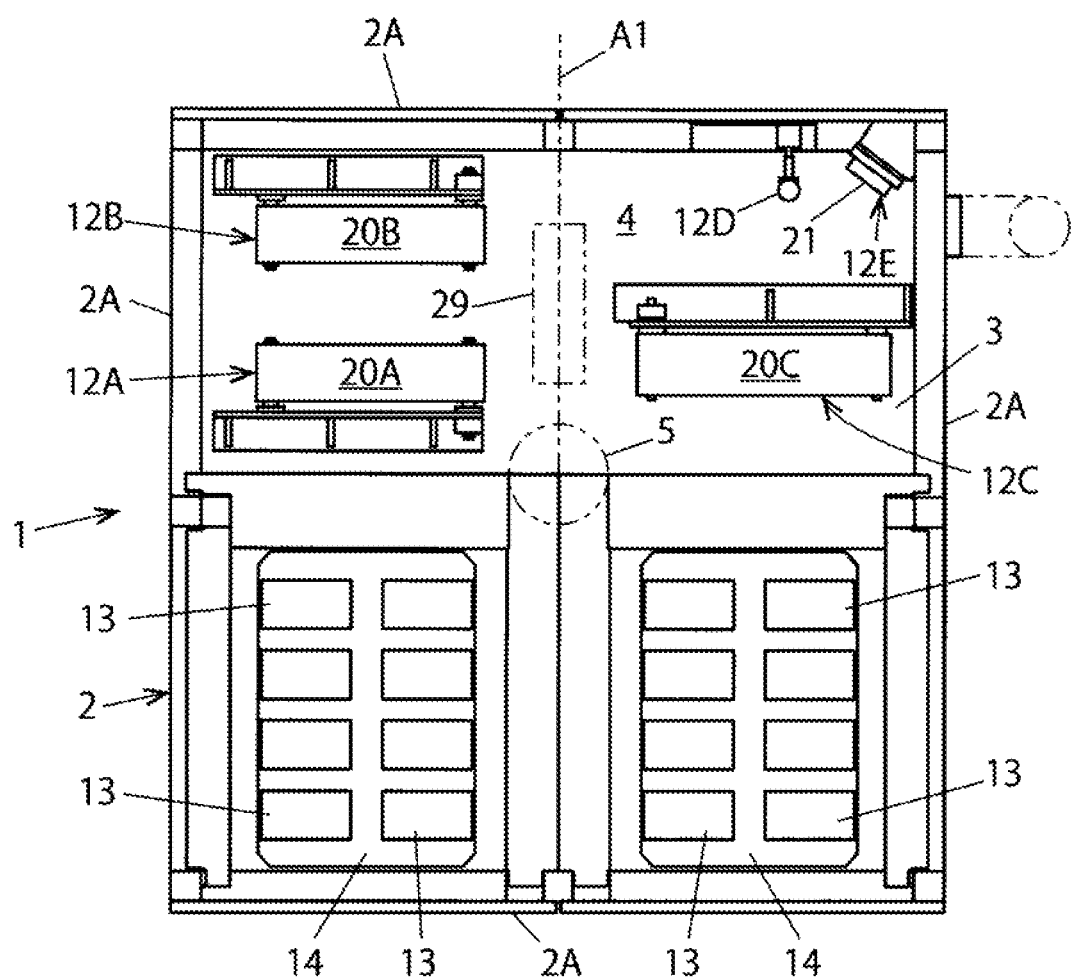
FIG. 3 illustrates the inside of the robot cell in FIG. 1 viewed from above.

As illustrated in FIG. 3 and FIG. 4, a plurality of processing devices 12 (12A, 12B, 12C, 12D) for processing the workpiece 13 in a state of being held by the robot hand 8 are installed in the work space 4 inside of the cell skeleton 2.

Namely, three kinds of belt-type grinding machines 12A, 12B, 12C are installed on the horizontal work table 3. All of these three kinds of grinding machines (processing devices) 12A, 12B, 12C perform grinding processing by pressing the workpiece 13 against the traveling grinding belts (processing surfaces) 20A, 20B, 20C.

Here, the grinding belts (processing surfaces) 20A, 20B, 20C of the belt-type grinding machines 12A, 12B, 12C can move elastically in the direction that the workpiece 13 is pressed against.

Also, an electric precision grinder 12D and a grinding brush 12E are installed on the side wall 2A of the cell skeleton 2 as other processing devices. The grinding brush 12E applies grinding processing on the workpiece 13 by rubbing the workpiece 13 against its grinding surface (processing surface) 21.

Figure 5:
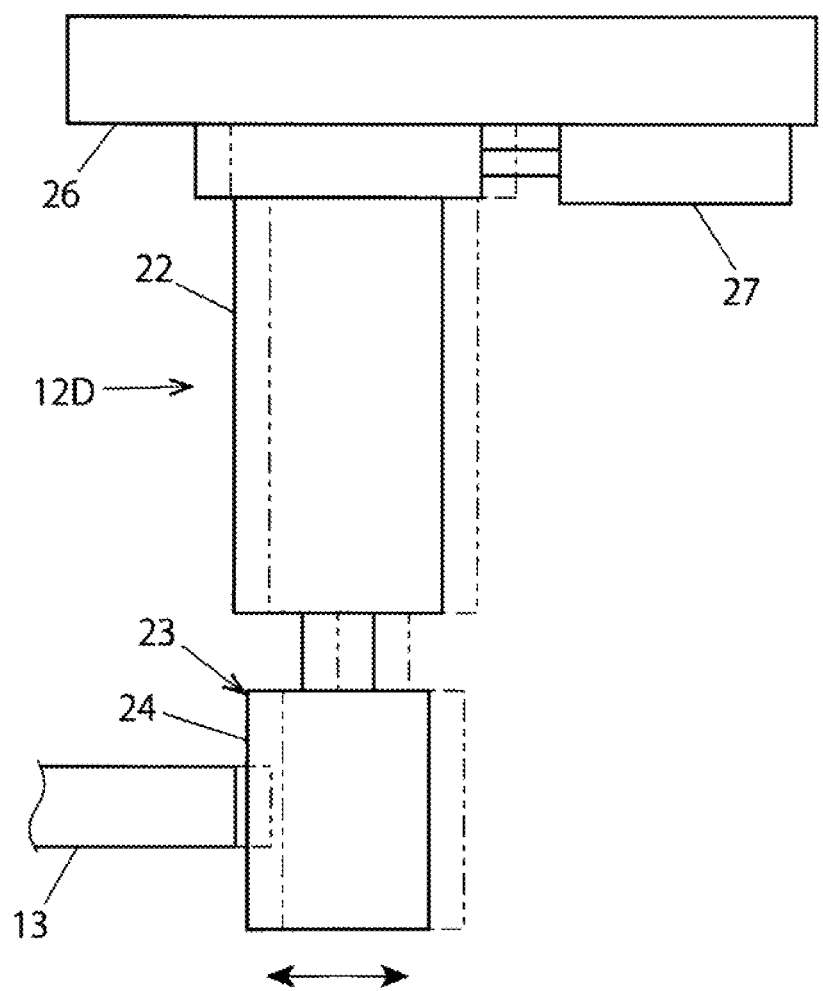
FIG. 5 is a side view illustrating a processing device (precision grinder) arranged inside of the robot cell in FIG. 1.

As illustrated in FIG. 5, the electric precision grinder 12D applies grinding processing on the workpiece 13 by pressing the workpiece 13 against a grinding surface (processing surface) 24 of a rotational grinding member 23 which is rotationally driven by a drive motor 22. A suction duct 25 (FIG. 4) for collecting grinding powder scattering upon grinding processing is installed near the electric precision grinder 12D.

As illustrated in FIG. 5, the electric precision grinder 12D is movably installed via a LM guide 26 fitted to the cell skeleton 2 and also is elastically movable in the direction that the workpiece 13 is pressed against by an elastically rebounding unit 27 such as an air cylinder.

As illustrated in FIG. 4, an air blow nozzle 28 for blowing off the grinding powder adhered to the workpiece 13 upon grinding processing is installed below the electric precision grinder 12D and grinding brush 12E on the side wall 2A of the robot cell 2.

A workpiece reverse support device 29 for supporting face/back reverse of the workpiece 13 in the robot hand 8 is installed to the ceiling 2B of the cell skeleton 2. The workpiece reverse support device 29 will be described in detail later referring to FIG. 28 to FIG. 34.

All of the three kinds of belt-type grinding machines 12A, 12B, 12C, electric precision grinder 12D, grinding brush 12E, air blow nozzle 28, and workpiece reverse support device 29 are arranged in a region on the rear side of the work space 4 of the cell skeleton 2.

A supply side opening 30A to which the supply side tray 14 is arranged and a discharge side opening 30B to which the discharge side tray 14 is arranged are formed on the front side of the horizontal work table 3. Of the plurality of trays 14 set to the supply side elevating/lowering portion 15A of the supply side tray elevating/lowering device 10A, the uppermost tray 14 is installed in the work space 4 via the supply side opening 30A.

In contrast, the discharge side tray 14 for storing the processed workpiece 13 is arranged in the discharge side elevating/lowering portion 15A of the discharge side tray elevating/lowering device 10A in the work space 4 via the discharge side opening 30B.

By operating the operation panel 19 in FIG. 2, press-in amount of the workpiece 13 to the processing surfaces 20A, 20B, 20C, 21 of the processing device 12 by the robot hand 8 can be manually adjusted via the control device 11 in FIG. 1. In this case, the operation panel 19 and control device 11 function as the manual adjusting unit in the present invention.

As described above, the robot cell 1 according to the present embodiment processes the workpiece 13 in a state of being held by the robot hand 8 by the various processing devices 12 installed in the robot cell. Therefore, the robot 5 of the robot cell 1 in the embodiment is required to move more complicatedly compared to the case when a workpiece is simply conveyed by a robot.

Then, in the robot cell 1 according to the embodiment, the various processing devices 12 for processing the workpiece 13 in the state of being held by the robot hand 8 are installed in the cell skeleton 2 and also the robot 5 is suspended from the ceiling 2B of the cell skeleton 2 so as to significantly improve the space efficiency, avoiding that the robot 5 moving complicatedly interferes with instruments/structures around the same.

Also, the processing surfaces (grinding surfaces) 20A, 20B, 20C, 21 of all of the processing devices 12 used in the robot cell 1 is elastically movable in the pressing direction of the workpiece 13. Therefore, when setting a pressing operation of the workpiece 13 by the robot 5, a moving width of the processing surfaces (grinding surfaces) 20A, 20B, 20C, 21 can be used as an allowable error in the robot operation.

As stated above, the moving width of the processing surfaces (grinding surfaces) 20A, 20B, 20C, 21 can be used as the allowable error in the robot operation. It is also effective for realizing a desired processing operation while making the robot 5 move complicatedly in the limited work space 4 in the robot cell 1 and avoiding interference with instruments/structures around the same.

Also, as the allowable error to the operation setting of the robot 5 is ensured as mentioned above, teaching work of the robot operation becomes easy. Therefore, all of the teaching data produced offline can be shared in the robot cell 1 even when a plurality of the same robot cells 1 are installed.

Thereby, it is enough that a test operation adjustment of the robot cell 1 is performed before carrying into the spot at the shipping source, for example, and also fine adjustment is performed at the spot while checking an actual operation of the robot 5. The fine adjustment can be performed by a worker at the spot using the operation panel 19.

Figure 6:
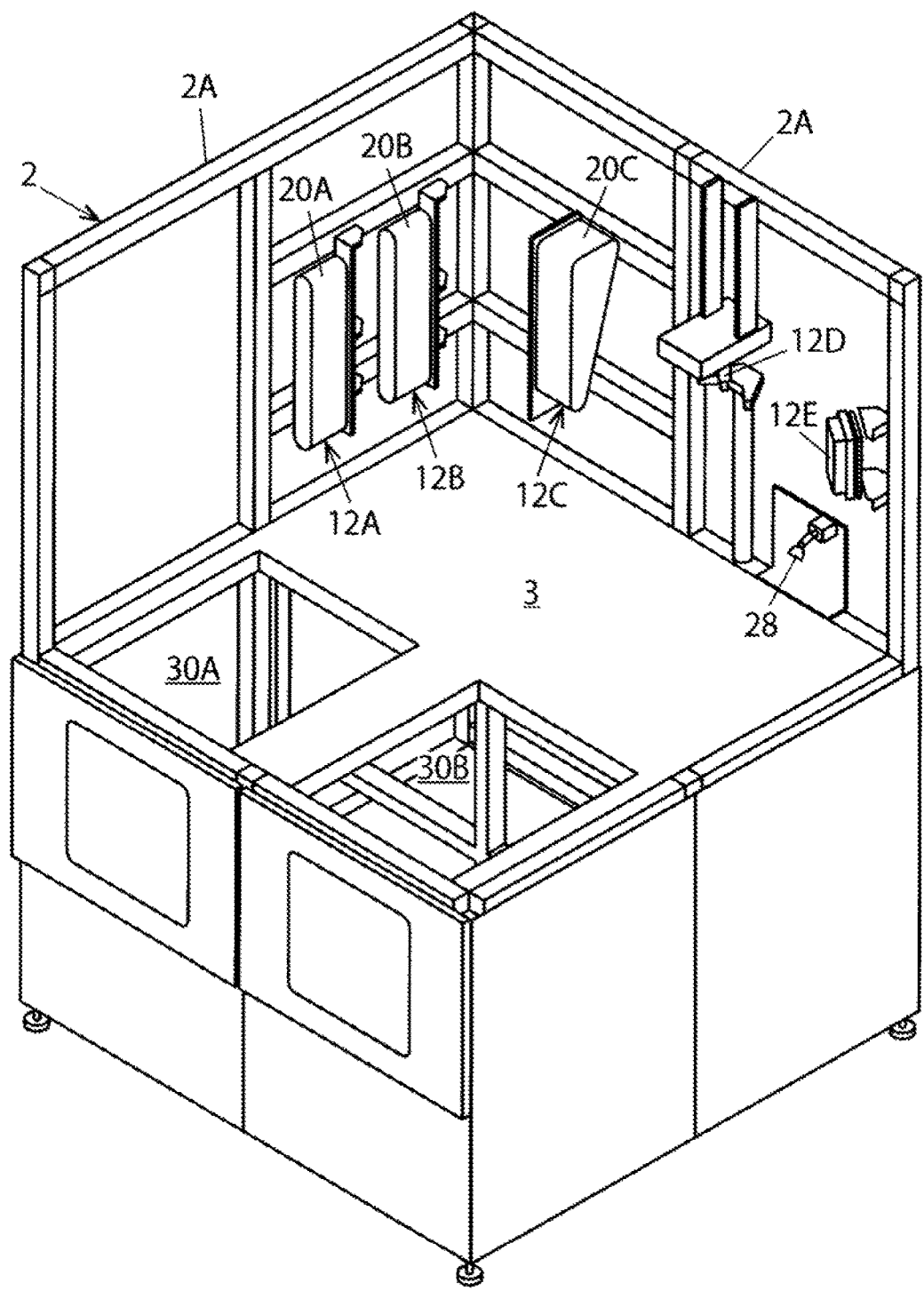
FIG. 6 illustrates the inside of a robot cell according to another embodiment of the present invention viewed from obliquely above.

FIG. 6 illustrates a variation of the above-mentioned robot cell 1, and all of the three kinds of belt-type grinding machines 12A, 12B, 12C are installed on the side wall 2A of the cell skeleton 2. Thereby, the grinding surfaces 20A, 20B, 20C of the belt-type grinding machines 12A, 12B, 12C extend in a substantially vertical direction (gravity direction).

As the grinding powder generated in the grinding processing falls down by gravity by orientating the grinding surfaces 20A, 20B, 20C of the belt-type grinding machines 12A, 12B, 12C as stated above, the grinding powder can be collected easily and surely by arranging a dust collecting duct below the belt-type grinding machines 12A, 12B, 12C, for example.

Also, as the processing device 12 is not on the horizontal work table 3 in the variation illustrated in FIG. 6, enough work space for performing maintenance work can be secured.

Next, a robot hand according to an embodiment of the present invention will be described referring to FIG. 7 to FIG. 27.

The robot hand 8 according to the embodiment has a hand base portion 31 mounted on a distal end of the robot arm 7, and the hand base portion 31 is provided with a workpiece holding unit 32 for holding a workpiece 13 during transfer and processing, as illustrated in FIG. 7 to FIG. 10.

The workpiece holding unit 32 has four sucking portions 33 for sucking the surface of the workpiece 13 so as to releasably hold the workpiece 13. Each sucking portion 33 is configured to be elastically deformed in a direction parallel to the surface of the workpiece 13 in the state that the workpiece 13 is sucked. Preferably, each sucking portion 33 is configured by a bellows-type vacuum sucking pad.

The robot hand 8 further has a workpiece positioning unit 34 for positioning the workpiece 13 held by the workpiece holding unit 32 to a predetermined position with respect to the workpiece holding unit 32. The workpiece positioning unit 34 has six positioning abutting members 35 for abutting on the workpiece 13 so as to position the workpiece 13 to a predetermined position.

The positioning abutting member 35 is composed of three sets of a pair of positioning abutting pieces 36A, 36B pinching the workpiece 13 from the both sides in a positioning position. Of the three sets of a pair of positioning abutting pieces 35A, 36B, two sets of a pair of positioning abutting pieces 36A pinch the long-side of the workpiece 13, and the remaining one set of a pair of positioning abutting pieces 36B pinch the short-side of the workpiece 13.

The pinching direction of the workpiece 13 by the positioning abutting piece 36A for the workpiece long-side and the pinching direction of the workpiece 13 by the positioning abutting piece 36B for the workpiece short-side are orthogonal to each other.

The width of the positioning abutting piece 36B for the workpiece short-side is larger than the width of the positioning abutting piece 36A for the workpiece long-side.

Figure 8:
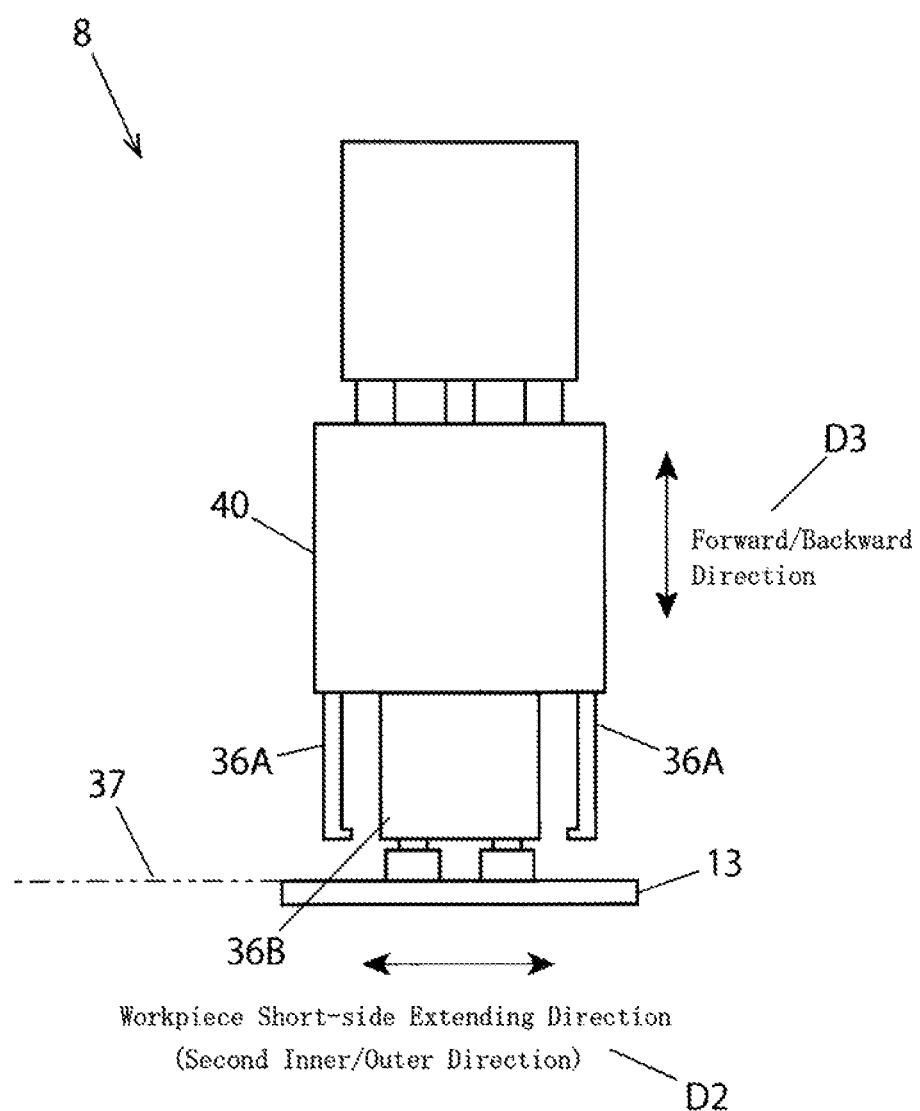
FIG. 8 is a side view of the robot hand in FIG. 7.
Figure 9:
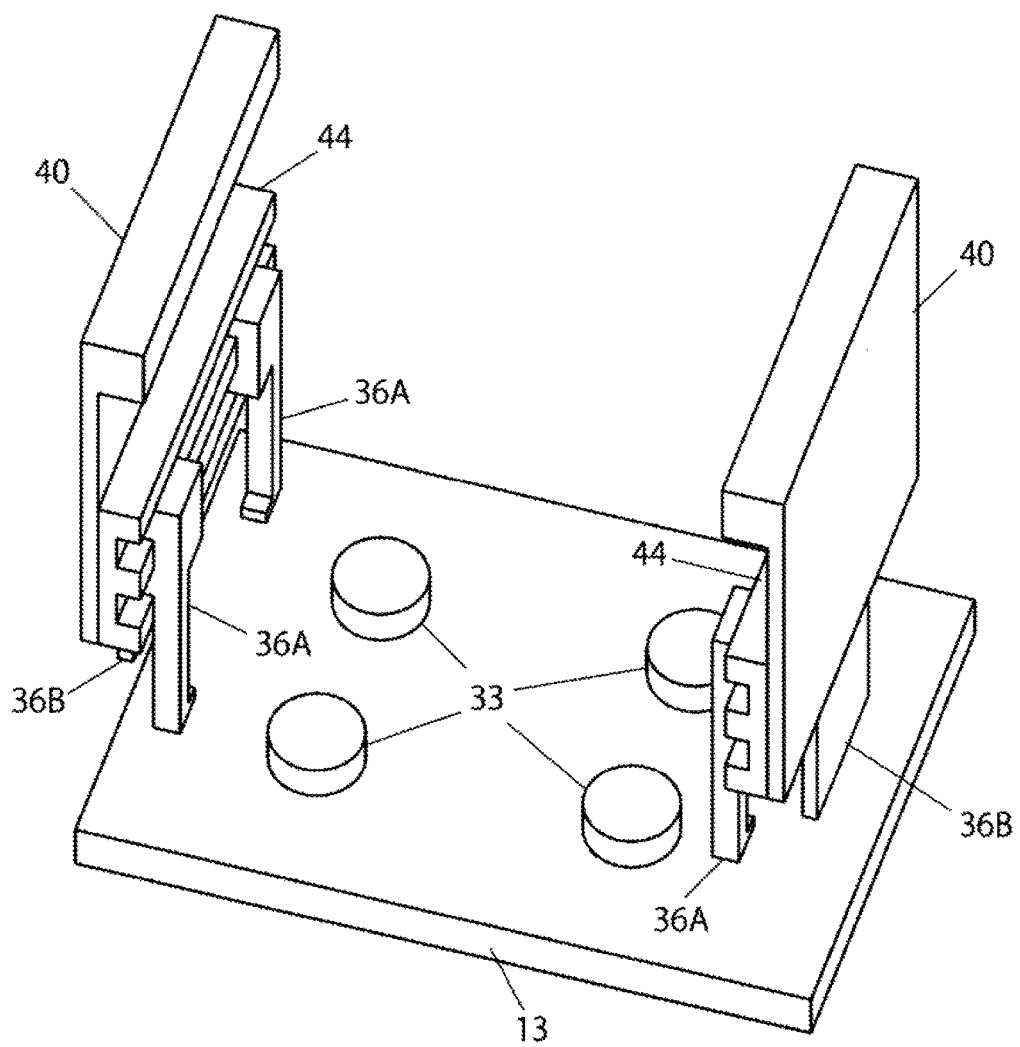
FIG. 9 is a perspective view illustrating part of the robot hand in FIG. 7.

As illustrated in FIG. 8 and FIG. 9, a distal end of the positioning abutting piece 36A protrudes inward.

The workpiece positioning unit 34 further has a forward/backward position switching unit 38 for switching the positioning abutting pieces 36A, 36B between a forward protruding position protruding more forward than a workpiece holding surface 37 of the workpiece holding unit 32 and a backward retracted position retracted backward from the workpiece holding surface 37.

Figure 7:
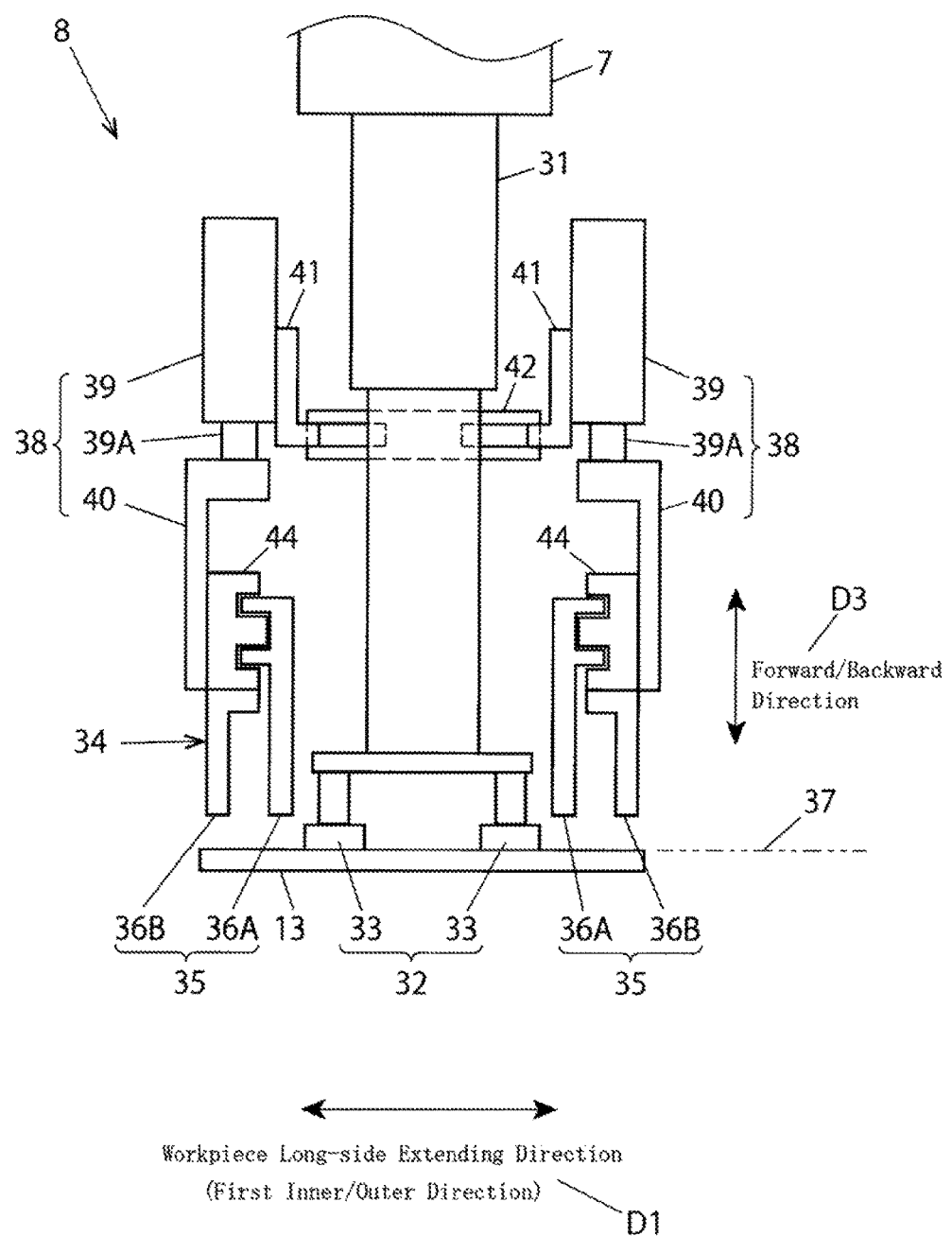
FIG. 7 is a front view of a robot hand according to an embodiment of the present invention, illustrating a state of workpiece processing.

As illustrated in FIG. 7, the forward/backward position switching unit 38 has a pair of air cylinders 39 for forward/backward operation and each abutting piece supporting member 40 is provided to a distal end of a piston 39A of each air cylinder 39 for forward/backward operation. The positioning abutting piece 36B for the short-side is fixingly provided to each abutting piece supporting member 40.

Each air cylinder 39 for forward/backward operation is fixingly provided to each cylinder supporting member 41, and each cylinder supporting member 41 is supported so as to be moved linearly by a first LM guide 42 fixingly provided to the hand base portion 31.

Figure 10:
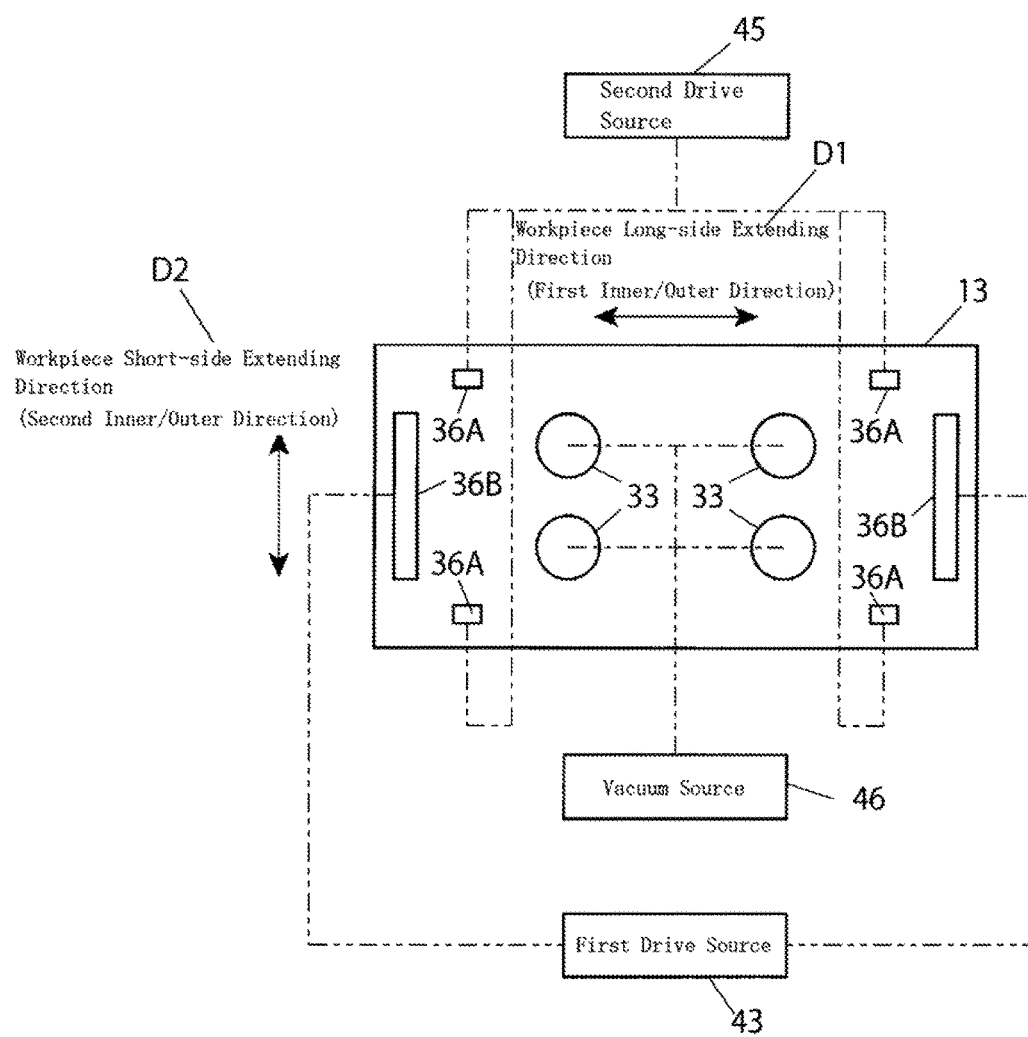
FIG. 10 is a schematic view illustrating part of the robot hand in FIG. 7 to FIG. 9 together with a first drive source, a second drive source, and a vacuum source.

Each cylinder supporting member 41 is driven to be moved linearly in a long-side extending direction (first inner/outer direction) D1 of the workpiece 13 by a first drive source 43 illustrated in FIG. 10. Thereby, the position of the pair of positioning abutting pieces 36B for the short-side is switched between a positioning position when positioning the workpiece 13 in a predetermined position, an outward spread position more outward than the positioning position, and an inward retracted position more inward than the positioning position.

Each second LM guide 44 is provided to the inner surface of each abutting piece supporting member 40, where each positioning abutting piece 36A for the workpiece long-side is supported to be moved linearly by each second LM guide 44. The linear motion direction by the second LM guide 44 is orthogonal to the linear motion direction by the first LM guide 42.

Each positioning abutting piece 36A for the workpiece long-side is driven to be moved linearly in a short-side extending direction (second inner/outer direction) D2 of the workpiece by a second drive source 45 in FIG. 10. Thereby, the position of the pair of positioning abutting pieces 36A for the long-side is switched between a positioning position when positioning the workpiece 13 in a predetermined position, an outward spread position more outward than the positioning position, and an inward retracted position more inward than the positioning position.

By the above-mentioned first LM guide 42, first drive source 43, second LM guide 44, and second drive source 45, the workpiece positioning unit 34 switching the positioning abutting pieces 36A, 36B between a positioning position when positioning the workpiece 13 in a predetermined position, an outward spread position more outward than the positioning position, and an inward retracted position more inward than the positioning position is configured.

Here, inward retracted position of the positioning abutting pieces 36A, 36B is a position overlapped with the workpiece 13 held by the workpiece holding unit 32 in a view from the axis line direction (direction orthogonal to the workpiece surface) of the robot arm 7 as illustrated in FIG. 10.

The abutting piece supporting member 40 is moved in a forward/backward direction (arm axis line direction) D3 by the reciprocating operation of the piston 39A of the air cylinders 39 for forward/backward operation illustrated in FIG. 7. Thereby, the positioning abutting piece 36A for the long side and the positioning abutting piece 36B for the short side are switched between the forward protruding position and the backward retracted position. The forward protruding position and the backward retracted position will be described later referring to FIG. 12 to FIG. 16.

Each sucking portion 33 of the workpiece holding unit 32 is evacuated by a vacuum source 46 in FIG. 10, thereby suckingly holding the surface of the workpiece 13. When releasing the workpiece 13 from each sucking portion 33, vacuum break air is supplied to each sucking portion 33 so as to release the vacuum state inside of each sucking portion 33, thereby releasing the workpiece 13.

Figure 11:
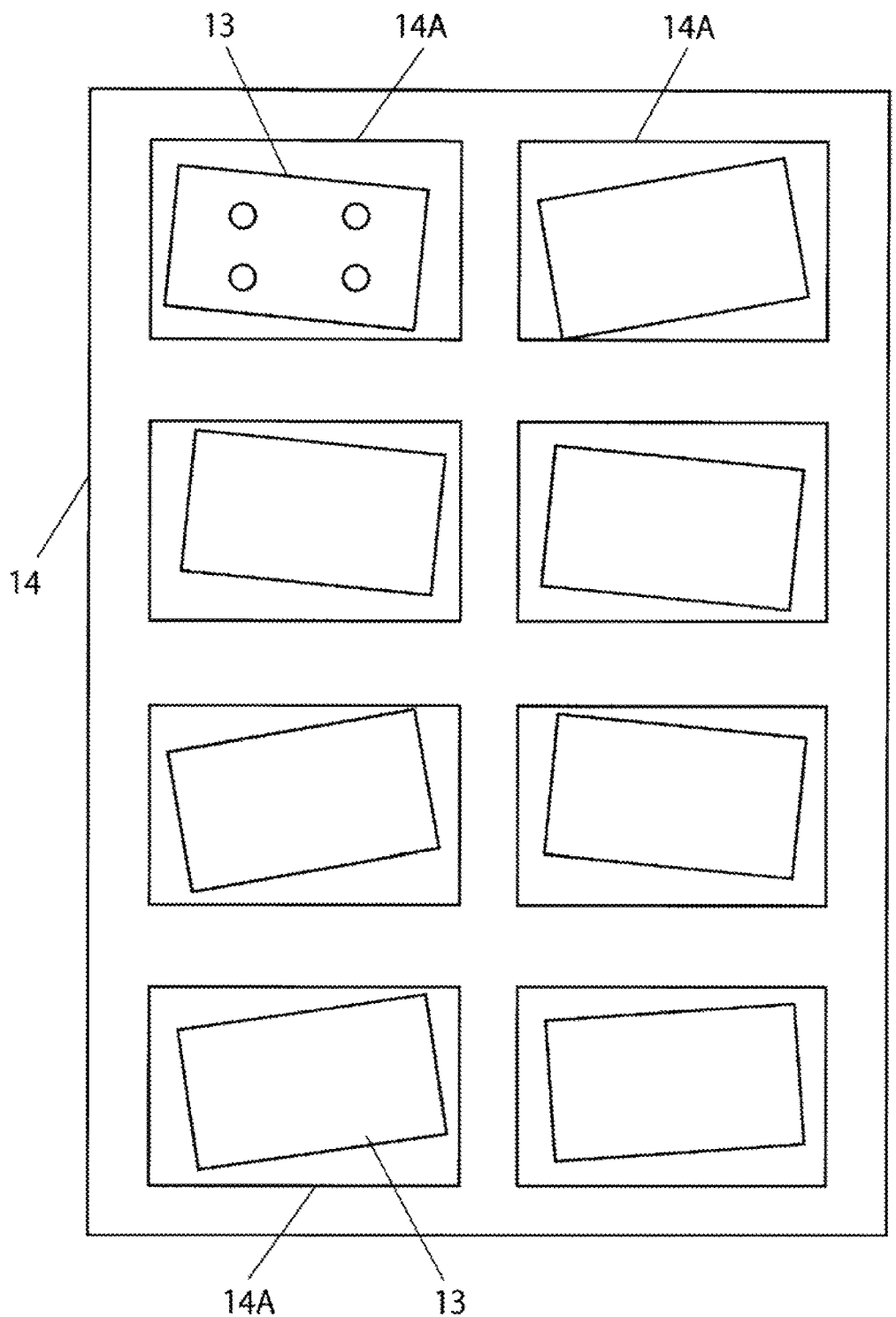
FIG. 11 is a schematic view illustrating the storage condition of a workpiece in a tray.

FIG. 11 illustrates the state that a plurality of workpieces 13 (eight pieces in FIG. 11 as an example) to be processed in the robot cell 1 are stored in the tray 14. Storing recessed portions 14A for storing their respective workpieces 13 are formed in the tray 14 and the inner periphery of each storing recessed portion 14A has a dimension a little larger than the outer periphery of the workpiece 13. Thereby, a certain clearance is formed between the inner periphery of the storing recessed portion 14A and the outer periphery of the workpiece 13.

Since there is a clearance between the inner periphery of the storing recessed portion 14A and the outer periphery of the workpiece 13 as stated above, the directions of the workpieces 13 stored in their respective storing recessed portions 14A are inconsistent with each other, as illustrated in FIG. 11. Therefore, the sucking position on the workpiece surface according to each sucking portion 33 of the workpiece holding unit 32 of the robot hand 8 cannot be constant in the plurality of workpieces 13.

As described above, the robot cell 1 according to the embodiment processes the workpiece 13 in a state held by the robot hand 8 by the processing device 12 installed thereinside. Therefore, the processing quality by the processing device 12 varies or processing of the workpiece 13 itself becomes impossible unless the workpiece 13 is precisely positioned in a predetermined position with respect to the workpiece holding unit 32 of the robot hand 8.

Especially in the grinding processing, the distance between the surface of the workpiece 13, and the processing surfaces 20A, 20B, 20C, 21 of the grinding machines 12A, 12B, 12C and the electric precision grinder 12D affects the processing quality, and therefore it is extremely important to position the workpiece 13 to a predetermined position precisely in the workpiece holding unit 32 of the robot hand 8.

Then, in the robot hand 8 according to the embodiment, after the workpiece 13 in the storing recessed portion 14A of the tray 14 is once held by the workpiece holding unit 32 and taken out, the holding position of the workpiece 13 is moved and corrected to a predetermined position by using the workpiece positioning unit 34.

Namely, after the sucking portion 33 of the workpiece holding unit 32 is abutting on the workpiece surface as illustrated in FIG. 7 and FIG. 8 and the surface of the workpiece 13 is suckingly held with the sucking portion 33 using a vacuum source 46 in FIG. 10, the workpiece 13 is pulled up and taken out from the storing recessed portion 14A of the tray 14.

Note that, although the positioning abutting pieces 36A, 36B of the workpiece positioning unit 34 need to be in the backward retracted positions as illustrated in FIG. 7 when taking out the workpiece 13 from the storing recessed portion 14A of the tray 14, they do not always need to be in the inward retracted positions and may be in the outward spread position. Namely, it is all right if the workpiece positioning unit 34 does not interfere with the workpiece 13 or the tray 14 during the sucking operation of the workpiece 13 by the workpiece holding unit 32.

Figure 12:
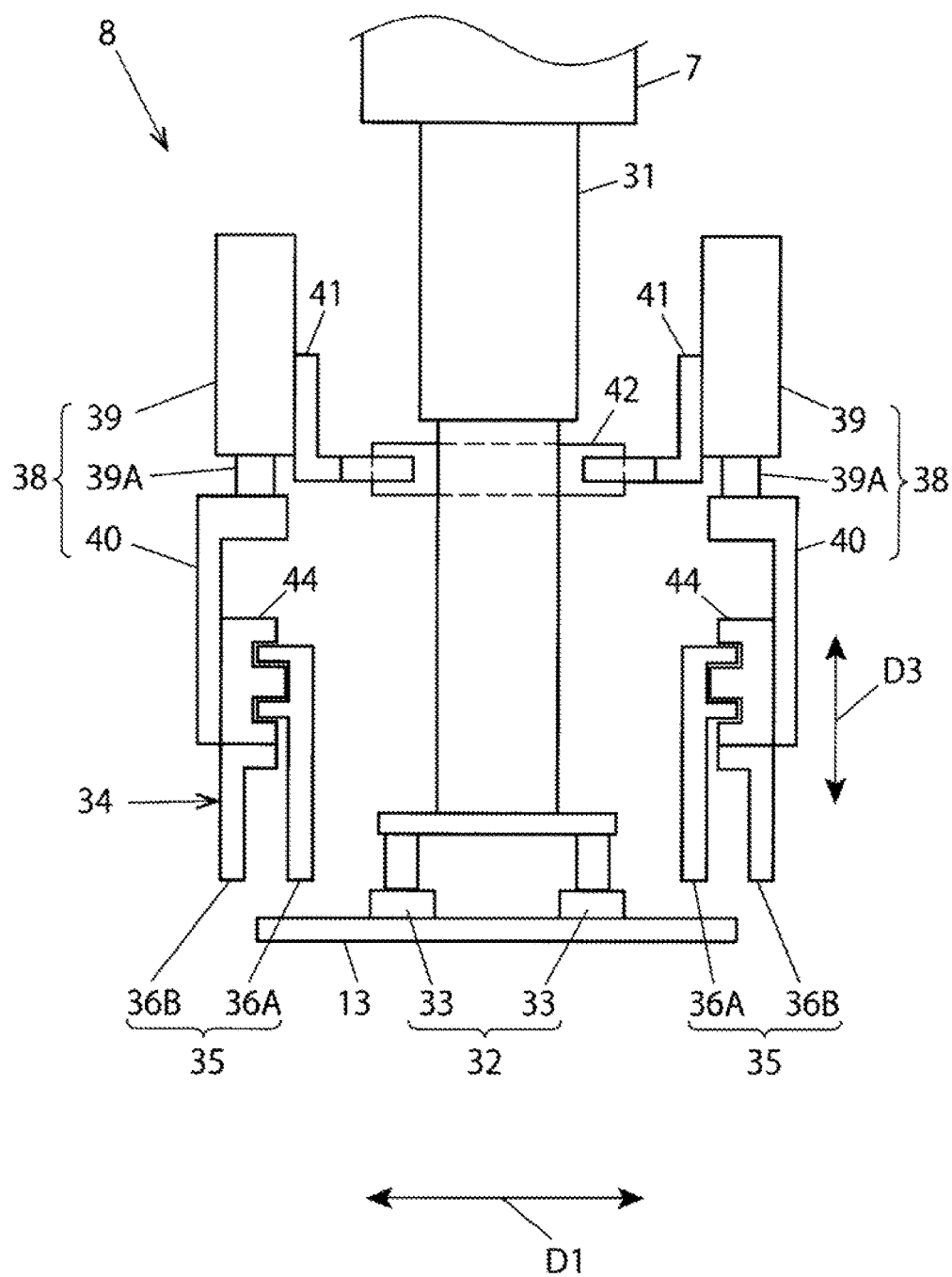
FIG. 12 is a front view illustrating the outer spread state in the robot hand in FIG. 7.
Figure 13:
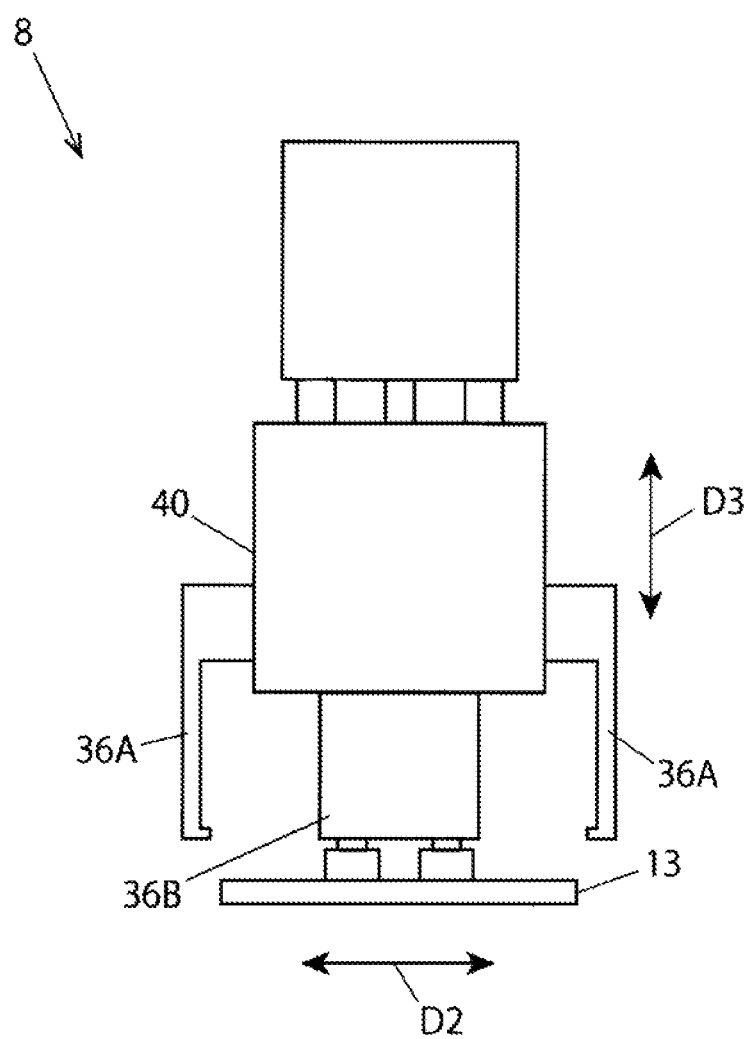
FIG. 13 is a side view of the robot hand in FIG. 12.
Figure 14:
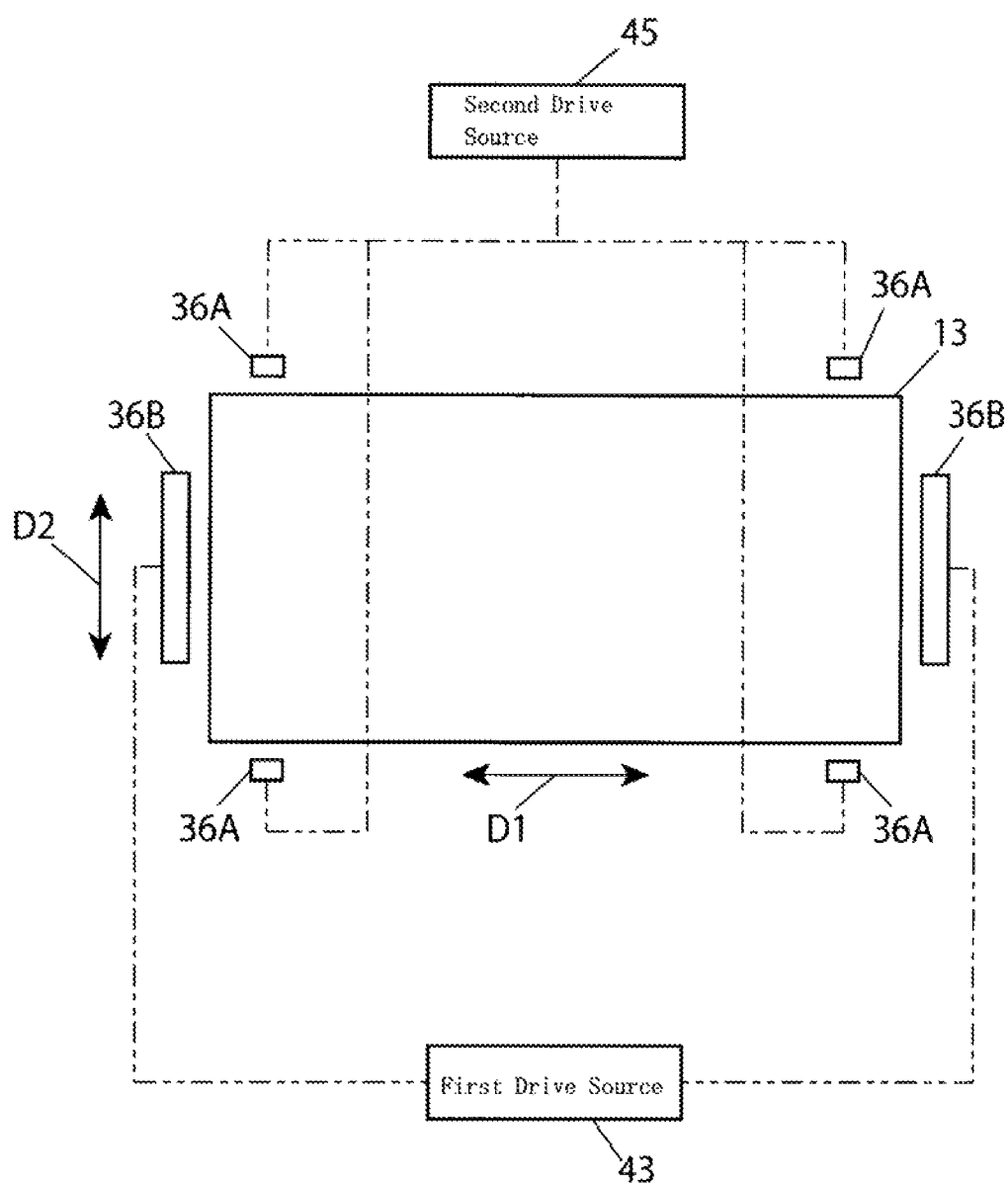
FIG. 14 a schematic view illustrating part of the robot hand in FIG. 12 and FIG. 13 together with the first drive source and second drive source.

Next, the first drive source and second drive source are operated so that the positioning abutting piece 36A for the long-side and the positioning abutting piece 36B for the short-side are moved to the outward spread position as illustrated in FIG. 12 to FIG. 14. Note that this spread operation is unnecessary when the positioning abutting piece 36A, 36B is already in the outward spread position.

Here, the outward spread position of the positioning abutting piece 36A, 36B is a position more outward than the outer periphery of the workpiece 13 held by the workpiece holding unit 32 in a view from the axis line direction (direction orthogonal to the workpiece surface) of the robot arm 7 as illustrated in FIG. 14. The outer spread position is set considering the dimension of the gap between the inner periphery of the storing recessed portion 14A of the tray 14 and the outer periphery of the workpiece 13, namely, the displacement amount of the workpiece 13 in the storing recessed portion 14A.

Figure 15:
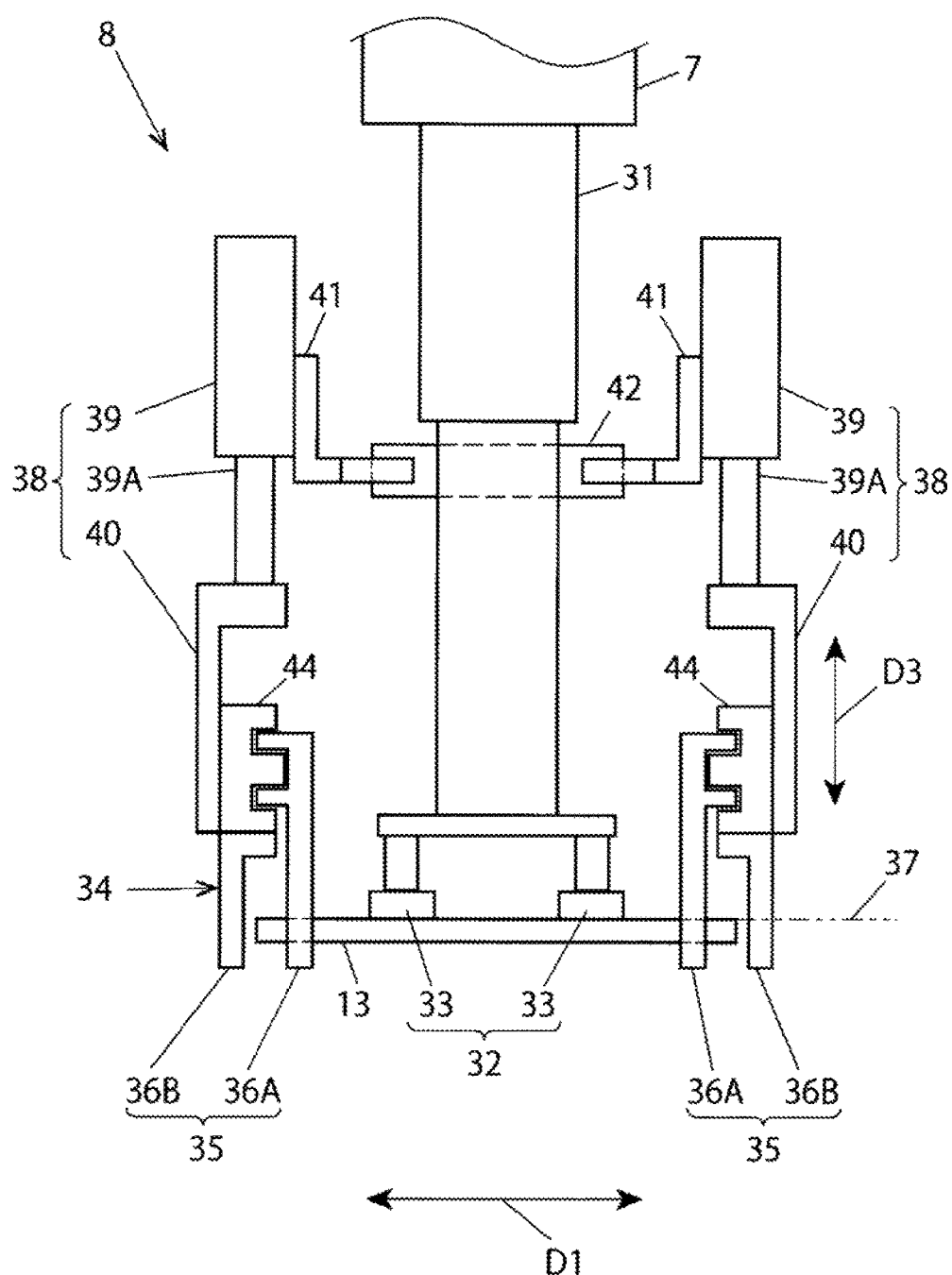
FIG. 15 is a front view illustrating the forward-projecting state in the robot hand in FIG. 7.
Figure 16:
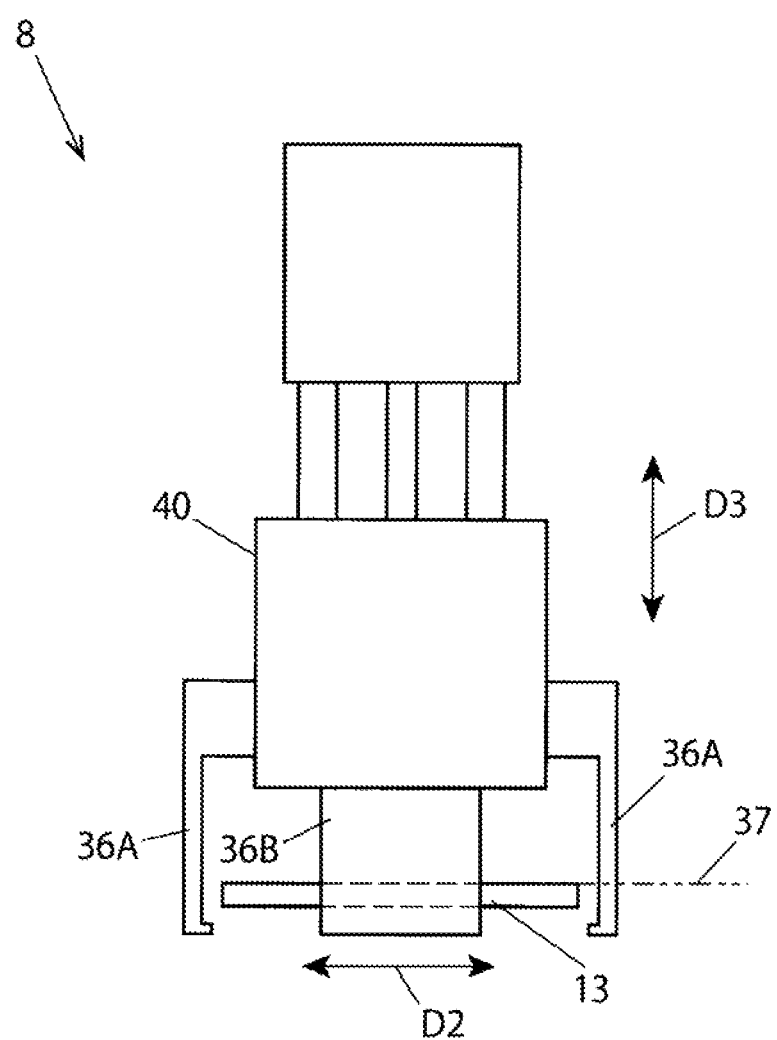
FIG. 16 is a side view of the robot hand in FIG. 15.

Next, as illustrated in FIG. 15 and FIG. 16, the positioning abutting piece 36A for the long-side and the positioning abutting piece 36B for the short-side in the backward retracted position are advanced to the forward protruding position by driving the air cylinder 39 for forward/backward operation. Thereby, each positioning abutting piece 36A, 36B is protruded more forward than the workpiece holding surface 37 of the workpiece holding unit 32.

Figure 17:
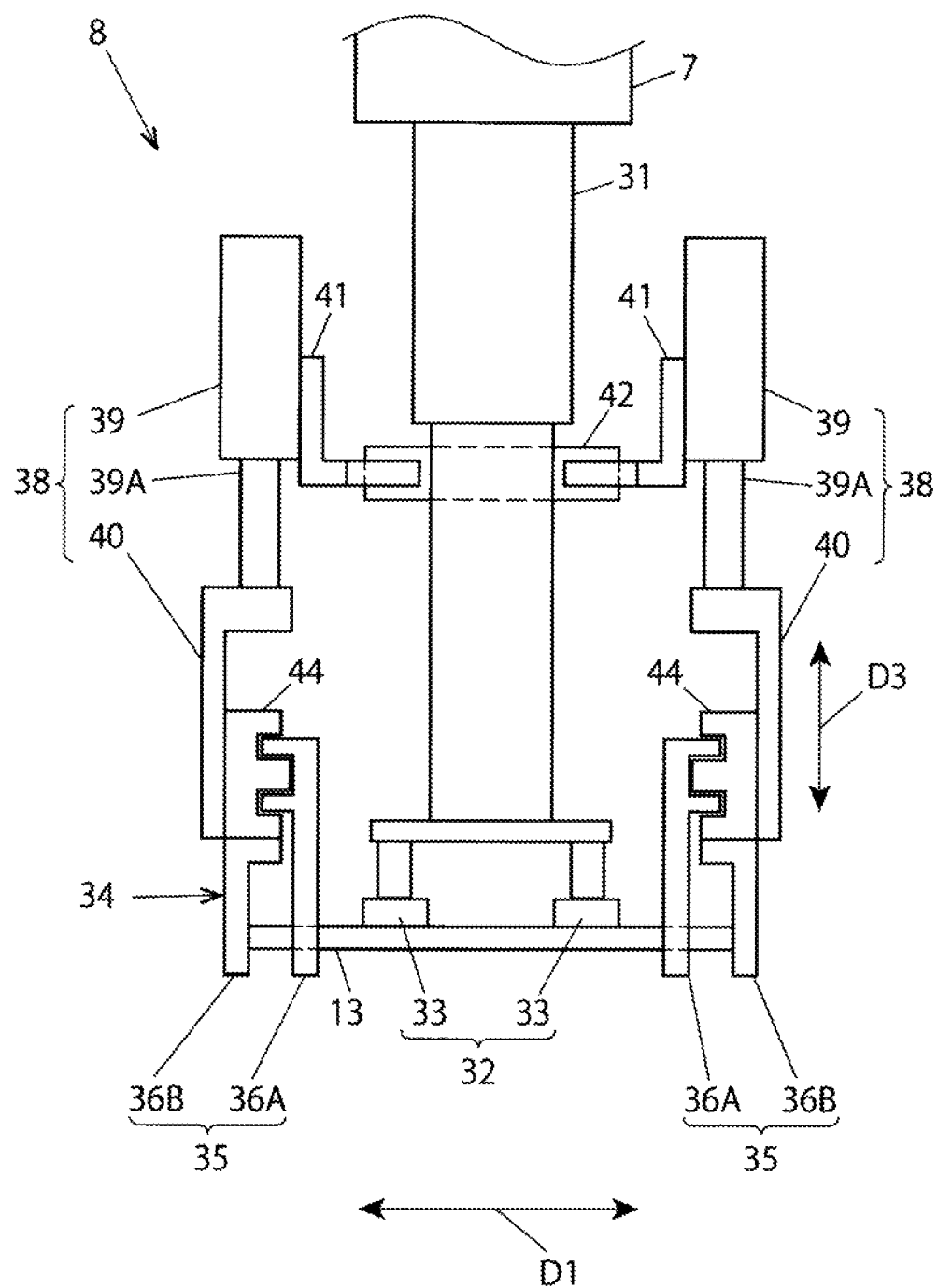
FIG. 17 is a front view illustrating the positioning state in the robot hand in FIG. 7.
Figure 18:
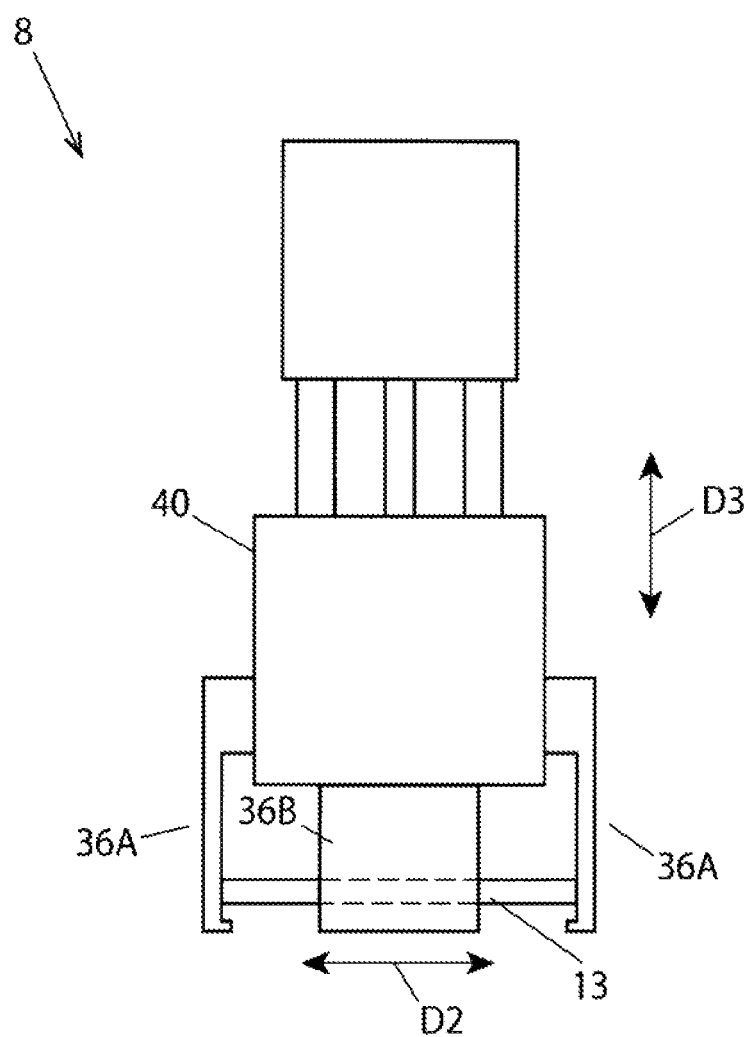
FIG. 18 is a side view of the robot hand in FIG. 17.
Figure 19:
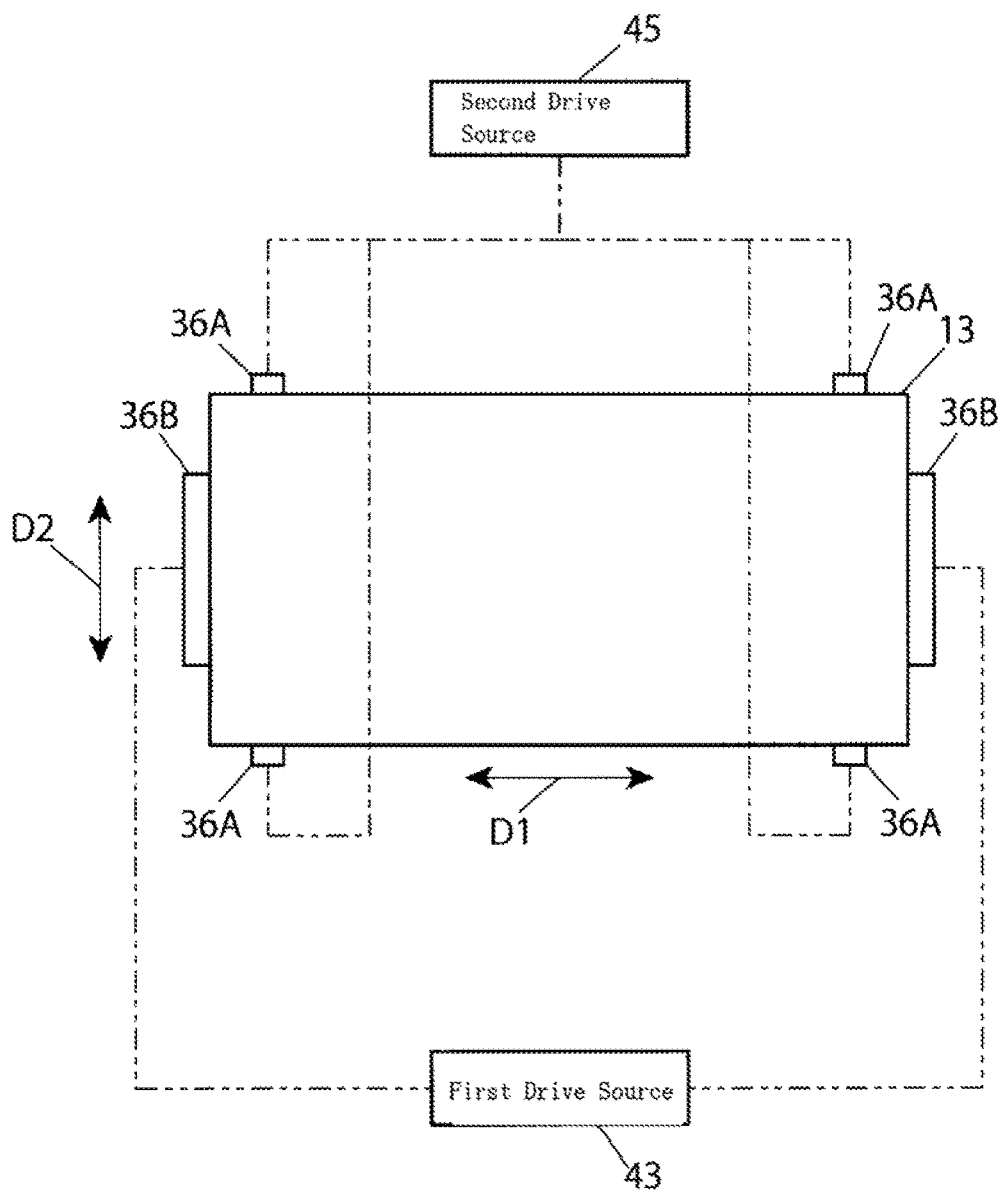
FIG. 19 is a schematic view illustrating part of the robot hand in FIG. 17 and FIG. 18 together with the first drive source and second drive source.

Next, as illustrated in FIG. 17 to FIG. 19, the positioning abutting piece 36A for the long-side and the positioning abutting piece 36B for the short-side in the outward spread position are moved to the positioning positions by driving the first drive source 43 and the second drive source 45.

Figure 20:
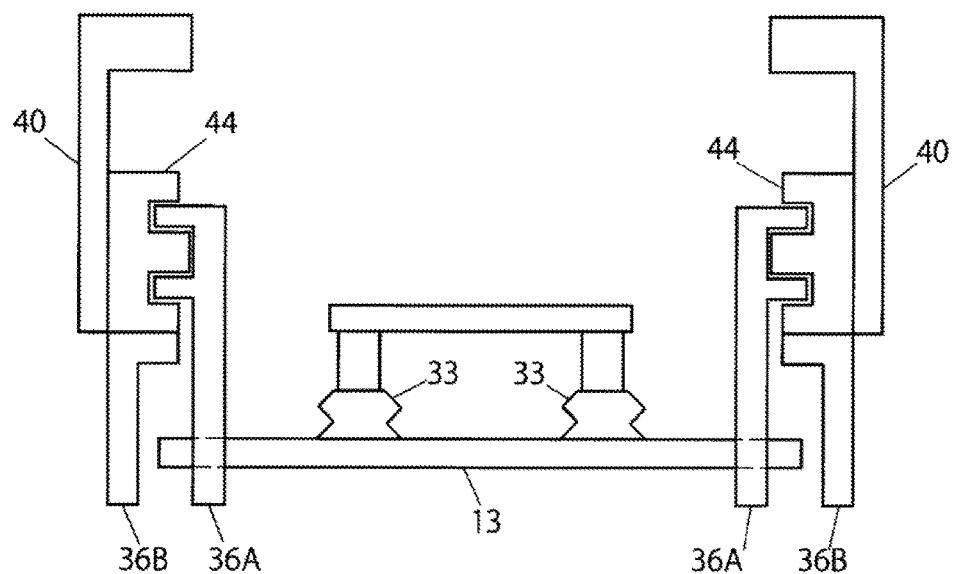
FIG. 20 is a schematic side view illustrating the workpiece positioning operation in the robot hand in FIG. 7, showing the forward-projecting state.
Figure 21:
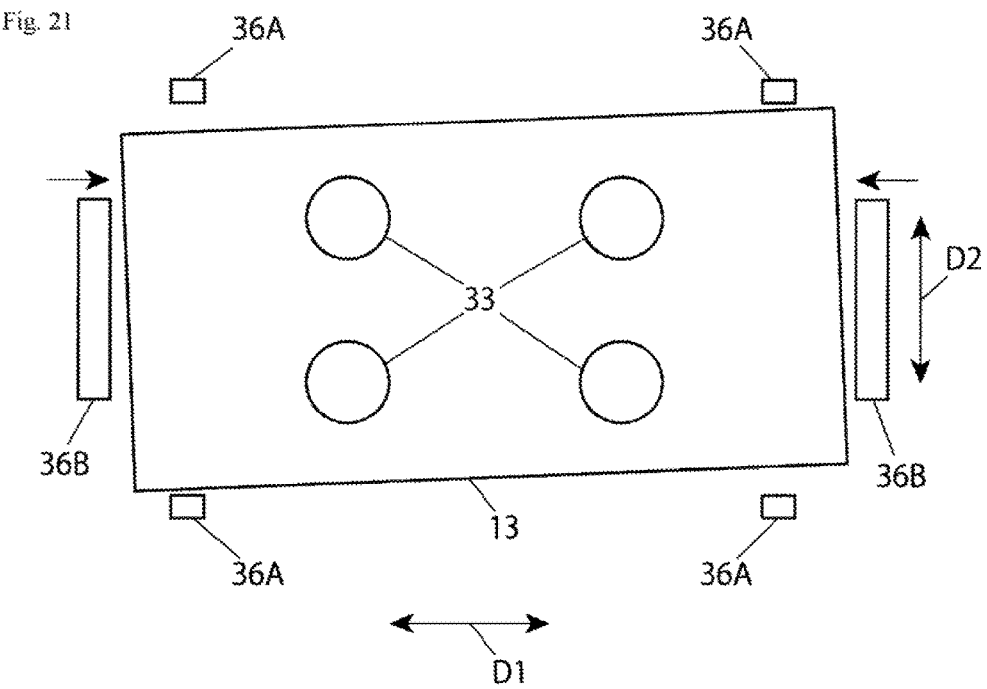
FIG. 21 is a schematic plan view corresponding to FIG. 20.
Figure 22:
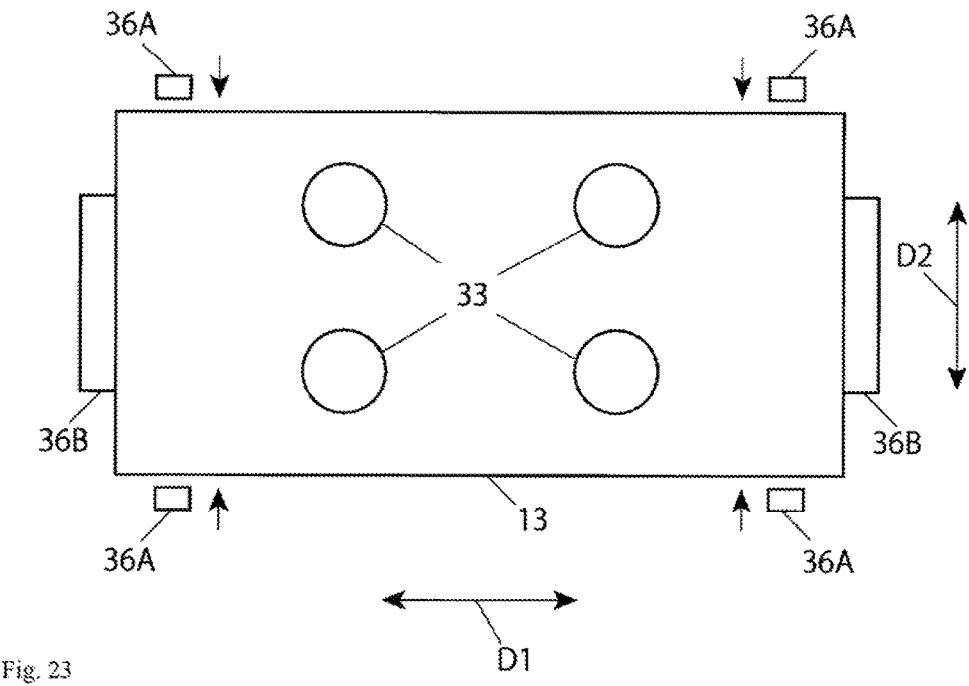
FIG. 22 is a schematic plan view illustrating the state that a short-side positioning abutting piece is moved to the positioning position from the state in FIG. 21.

Specifically, of the positioning abutting pieces 36A, 36B in the outward spread position illustrated in FIG. 20 and FIG. 21, firstly the positioning abutting piece 36B for the short-side is moved to the positioning position as illustrated in FIG. 22 by a first drive source 43. Thereby, the workpiece 13 is positioned in the workpiece long-side extending direction D1 in a state of being held by the workpiece holding unit 32.

Figure 23:
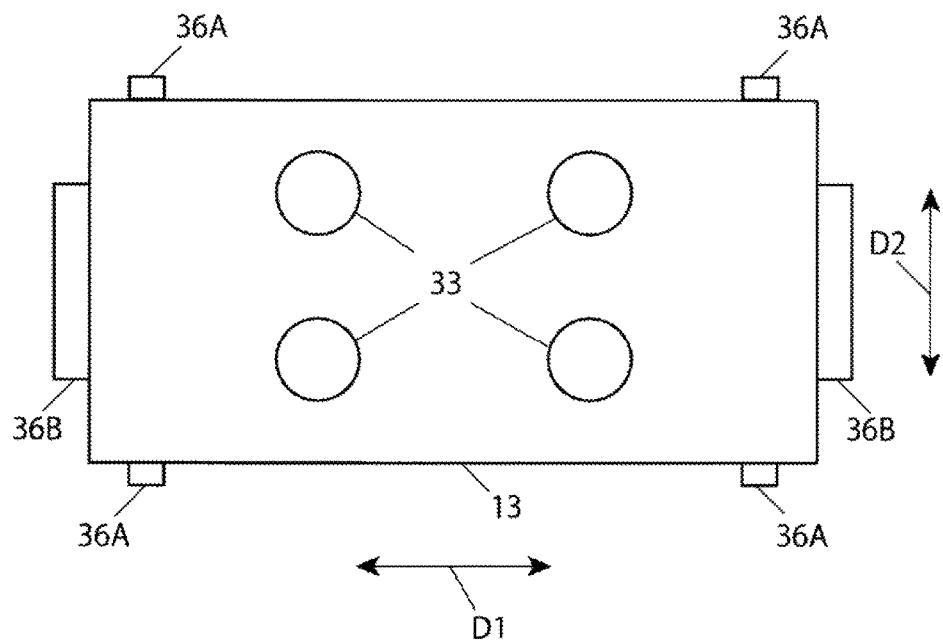
FIG. 23 is a schematic plan view illustrating the state that a long-side positioning abutting piece is moved to the positioning position from the state in FIG. 22.

Next, the positioning abutting piece 36A for the long-side is moved to the positioning position as illustrated in FIG. 23 by a second drive unit 45. Thereby, the workpiece 13 is positioned in the workpiece short-side extending direction D2 in a state of being held by the workpiece holding unit 32.

Figure 24:
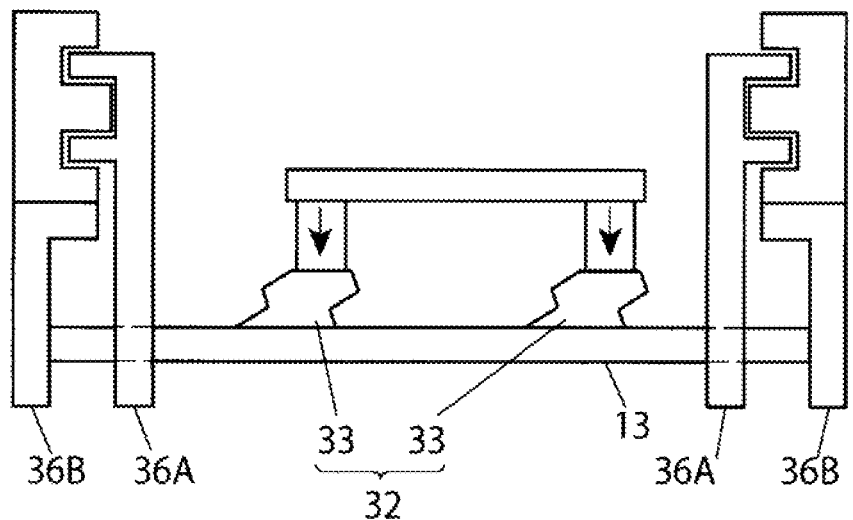
FIG. 24 is a schematic front view illustrating how a sucking pad is deformed in the state in FIG. 23.

By these operations, the workpiece 13 is positioned to a predetermined position as illustrated in FIG. 23. At this time, the sucking portion 33 of the workpiece holding unit 32 is in a deformed shape deviating from a normal shape as illustrated in FIG. 24. Namely, as the sucking portion 33 is elastically deformable in a direction parallel to the surface of the workpiece 13, when the workpiece 13 is moved by the positioning abutting pieces 36A, 36B, it is deformed according to the movement of the workpiece 13 as illustrated in FIG. 24.

Figure 25:
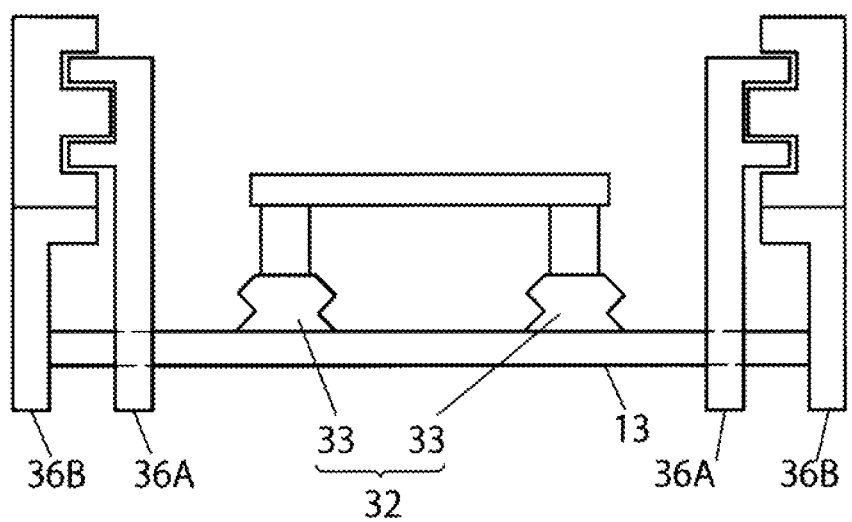
FIG. 25 is a schematic front view illustrating how the sucking pad is returned to the normal state by supplying vacuum destructing air.
Figure 26:
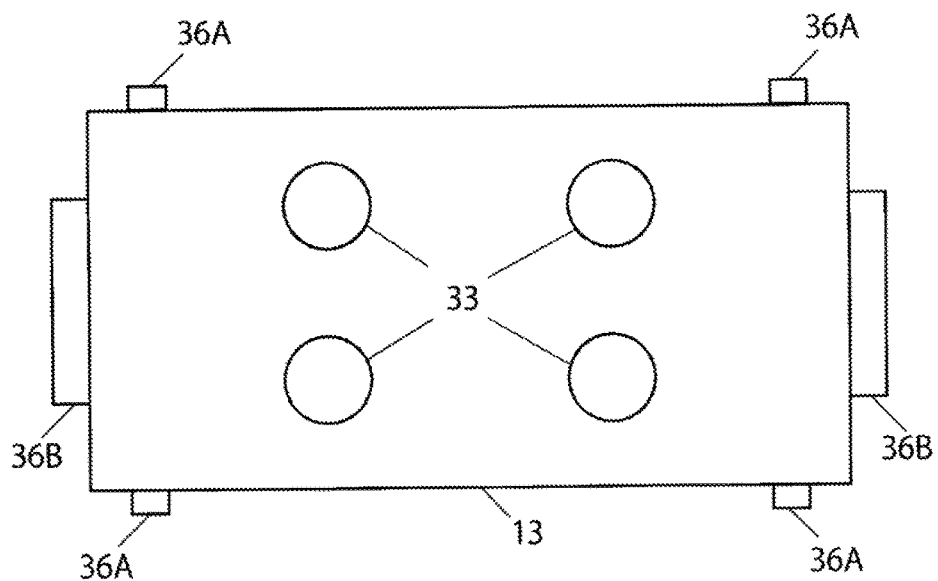
FIG. 26 is a schematic plan view corresponding to FIG. 25.

In the state in FIG. 24, the vacuum destructing air is supplied to each sucking portion 33 instantaneously so as to release the sucking state between each sucking portion 33 and the surface of the workpiece 13 instantaneously. Then, each sucking portion 33 is returned to the normal shape as illustrated in FIG. 25 and also each sucking portion 33 is moved to a predetermined position on the surface of the workpiece 13 as illustrated in FIG. 26 and suckingly holds the workpiece 13 in the predetermined position.

Note that, even when the vacuum destructing air is supplied to each sucking portion 33 instantaneously, the workpiece 13 does not drop from the robot hand 8 since it is pinched by the positioning abutting pieces 36A, 36B.

Also, even when the workpiece 13 is pressed and moved when the vacuum destructing air is supplied to the sucking portion 33, since the distal end of the positioning abutting piece 36A for the workpiece long-side protrudes inward, the protruding portion can receive the workpiece 13, surely preventing the workpiece 13 from dropping.

After holding the workpiece 13 in the predetermined position by the workpiece holding unit 32 according to the operations above, the air cylinder 39 for forward/backward operation is driven so as to retract the positioning abutting pieces 36A and 36B to the backward retracted positions. Subsequently, the positioning abutting pieces 36A, 36B are retracted to the inward retracted positions by the first drive source 43 and second drive source 45.

Figure 27:
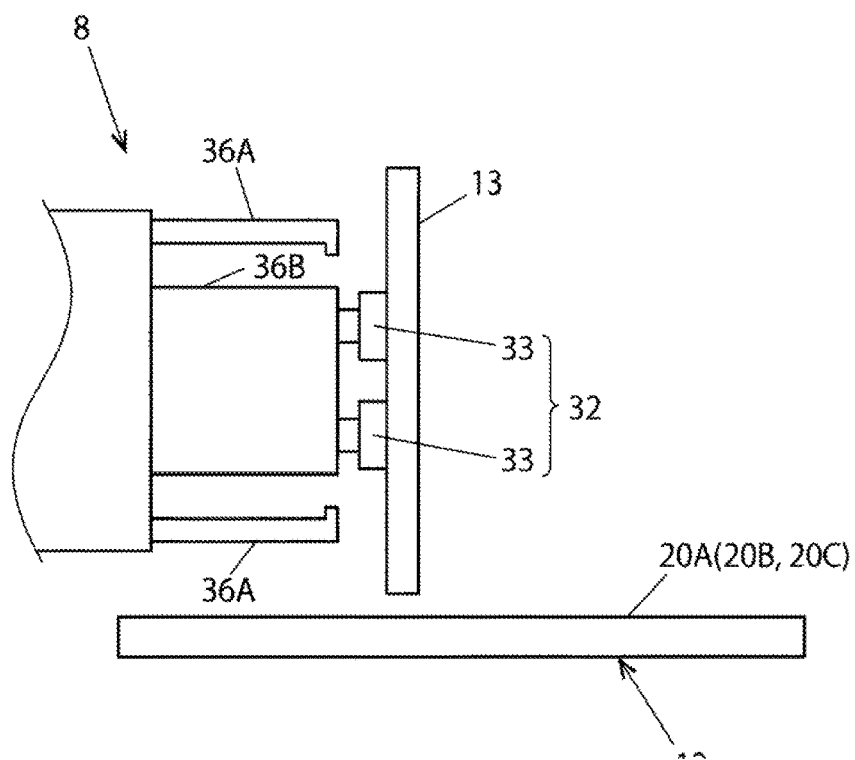
FIG. 27 is a schematic side view illustrating how the workpiece held by the robot hand in FIG. 27 is ground.

FIG. 27 illustrates how the workpiece 13 positioned in the predetermined position according to the above operations is processed by the processing surfaces (grinding surfaces) 20A, 20B, 20C of the processing device 12 in the state that the workpiece 13 is held by the workpiece holding unit 32 of the robot hand 8. Here, as the positioning abutting pieces 36A, 36B are retracted to the inward retracted positions, the positioning abutting pieces 36A, 36B can be avoided from interfering with the processing surfaces (grinding surfaces) 20A, 20B, 20C of the processing device 12 when carrying out the grinding process on the side peripheral surface of the workpiece 13, as illustrated in FIG. 27.

As stated above, in the robot hand 8 according to the embodiment, the robot hand 8 itself comprises a function of positioning the workpiece 13, and therefore a special apparatus does not need to be arranged only for positioning the workpiece 13 and the limited work space 4 in the robot cell 1 can be used effectively.

Also, in the robot hand 8 according to the embodiment, the workpiece holding unit 32 for sucking the surface of the workpiece 13 so as to hold the same is used and also the positioning abutting pieces 36A, 36B can be retracted to the backward retracted positions and inward retracted positions when processing the workpiece 13, and therefore the grinding process on the side peripheral surface of the workpiece 13, for example, can be performed without any problems.

Next, the workpiece reverse support device 29 according to an embodiment of the present invention will be described referring to FIG. 28 to FIG. 34.

As stated above, although the robot hand 8 sucks the surface of the workpiece 13 by each sucking portion 33 of the workpiece holding unit 32 so as to suck the workpiece 13, sometimes the surface of the workpiece 13 directed upward in a state of being stored in the tray 14 is processed by the processing device 12 depending on the kinds or processing contents of the workpiece 13. In this case, the workpiece 13 taken out from the tray 14 by the robot hand 8 needs to be reheld by the robot hand 8 reversing face/back.

The workpiece reverse support device 29 according to the embodiment is for supporting the face/back reverse of the workpiece 13 in the robot hand 8 in such a case and preferably installed on the ceiling 12B of the robot cell 1 as illustrated in FIG. 4.

Figure 28:
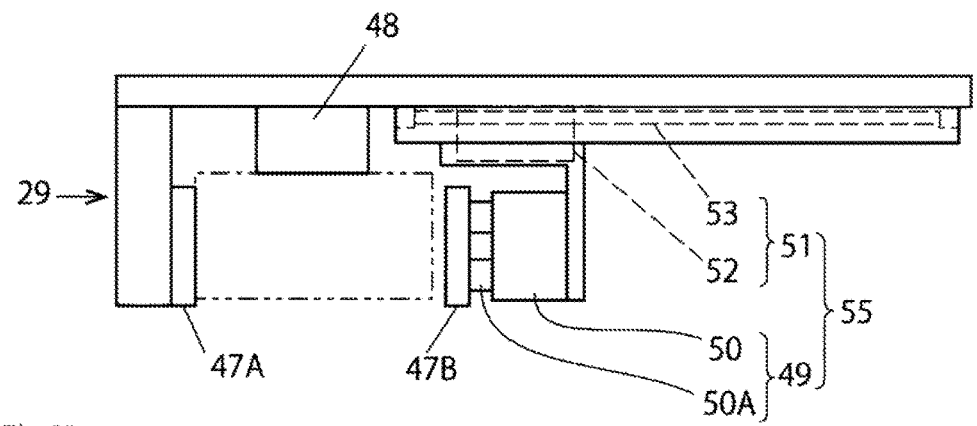
FIG. 28 is a side view illustrating a workpiece reverse support device according to an embodiment of the present invention.
Figure 29:
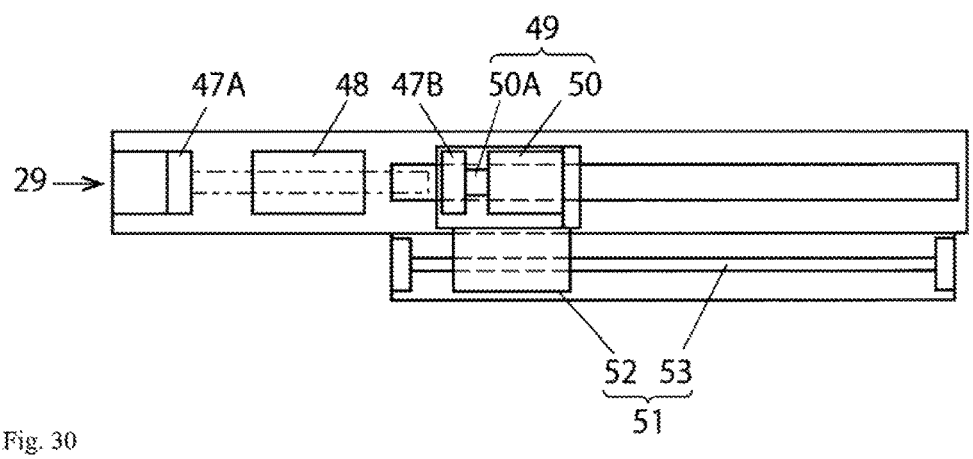
FIG. 29 is a bottom view of the workpiece reverse support device in FIG. 28.

As illustrated in FIG. 28 (side view) and FIG. 29 (bottom view), the workpiece reverse support device 29 according to the embodiment has a pair of workpiece pinching members 47A, 47B abutting on their respective opposing side portions of the workpiece 13 held by the robot hand 8 so as to pinch the workpiece 13. The pair of workpiece pinching members 47A, 47B are composed of a fixed workpiece pinching member 47A and a movable workpiece pinching member 47B, pinching the workpiece 13 so that the workpiece 13 is substantially orthogonal to the ceiling surface of the robot cell 1.

A ceiling side abutting base 48 is provided above the workpiece 13 pinched by the fixed workpiece pinching member 47A and the movable workpiece pinching member 47B.

Figure 30:
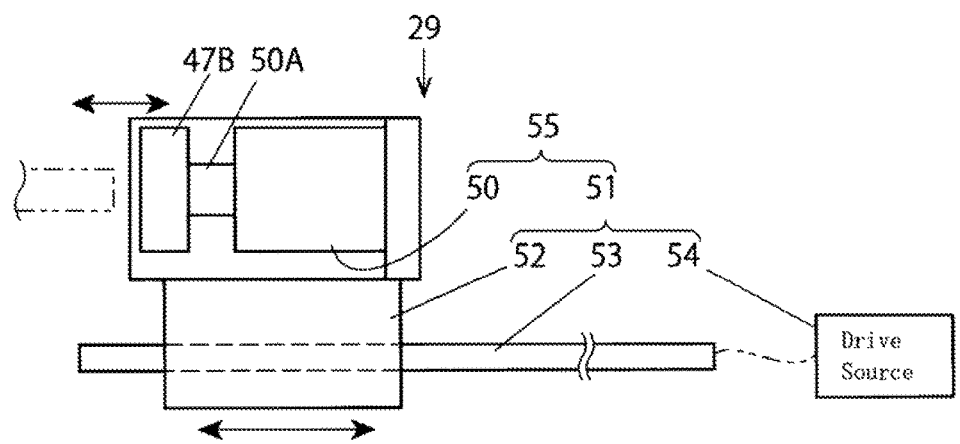
FIG. 30 is a system diagram schematically illustrating the workpiece reverse support device in FIG. 28.

The workpiece reverse support device 29 further comprises a workpiece pinching member drive unit 49 as illustrated in FIG. 30, and the workpiece pinching member drive unit 49 has a fluid pressure cylinder 50 including a piston 50A on which the movable workpiece pinching member 47B is mounted and a cylinder moving unit 51 for moving the fluid pressure cylinder 50 in the reciprocating direction of the piston 50A. The fluid pressure cylinder 50 is preferably an air cylinder.

The cylinder moving unit 51 comprises a travelling member 52 to which the fluid pressure cylinder 50 is fixingly provided and a travelling member LM guide 53 supporting the travelling member 52 so that it moves linearly, and a drive source 54 for travelling which drives the travelling member 52 so that it travels. The position of the fluid pressure cylinder 50 can be switched between the first position in FIG. 31 and the second position in FIG. 32 by the cylinder moving unit 51.

A pinching state switching member 55 is configured for switching the position of the movable workpiece pinching member 47B between the position in the workpiece 13 pinching state and the position in the releasing state by the fluid pressure cylinder 50 and the cylinder moving unit 51.

Figure 31:
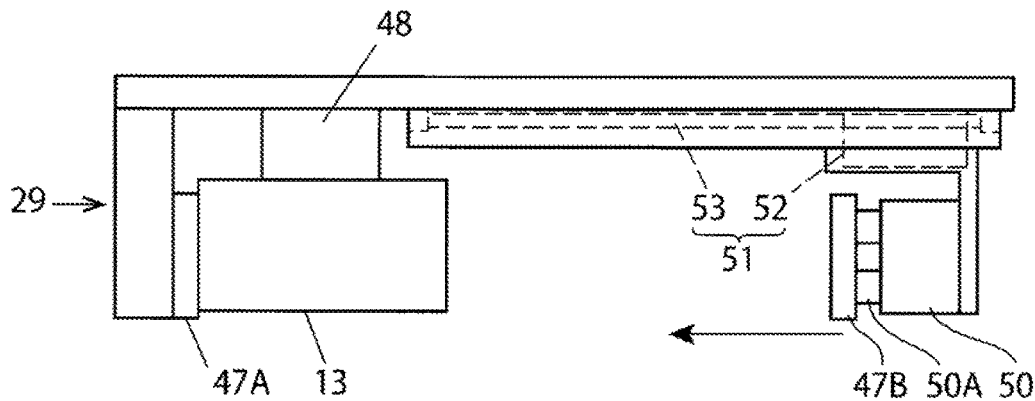
FIG. 31 is a side view illustrating the operation of the workpiece reverse support device in FIG. 28, showing the state that a fluid pressure cylinder is in a first position.
Figure 34:
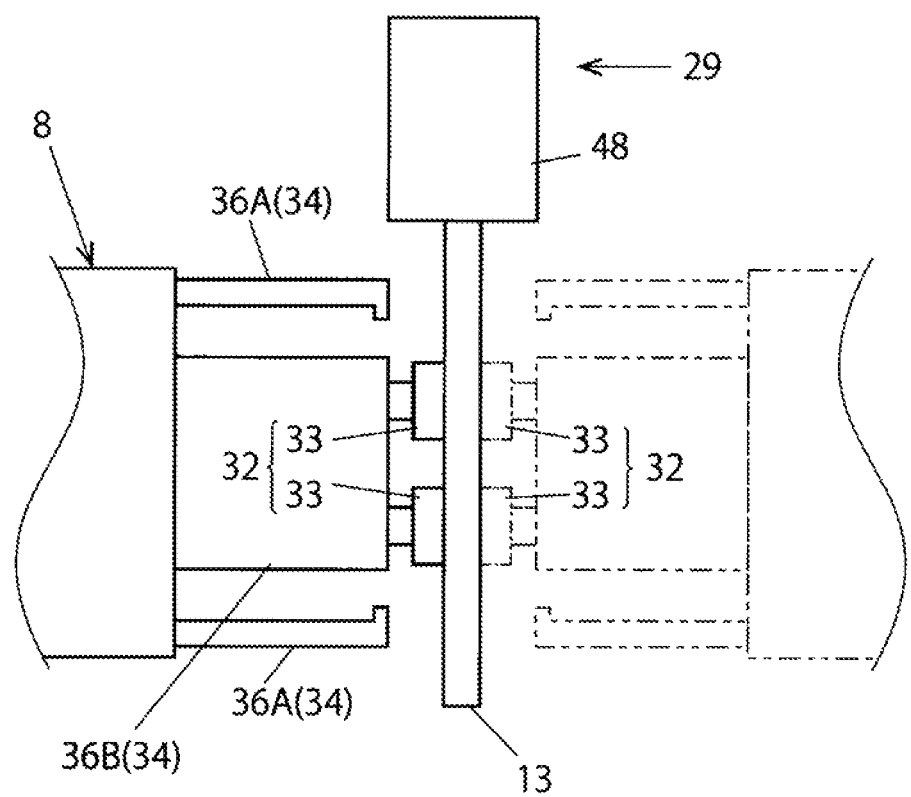
FIG. 34 is a schematic view illustrating how the workpiece held by the workpiece reverse support device in FIG. 28 is reversely held by the robot hand.

When reversing the workpiece 13 face/back in the robot hand 8 using the workpiece reverse support device 29, the workpiece 13 held by the workpiece holding unit 32 of the robot hand 8 is abutted on the fixed workpiece pinching member 47A and the ceiling side abutting base 48 by the operation of the robot 5 as illustrated in FIG. 31 and FIG. 34 in the state that the fluid pressure cylinder 50 is made in the first position in FIG. 31 by the cylinder moving unit 51.

Here, the workpiece 13 held by the workpiece holding unit 32 of the robot hand 8 is positioned in a predetermined position relative to the workpiece holding unit 32 by the above-stated workpiece positioning unit 34. Therefore, the workpiece 13 can be accurately positioned to the fixed workpiece pinching member 47A and the ceiling side abutting base 48 by the operation of the robot 5.

Figure 32:
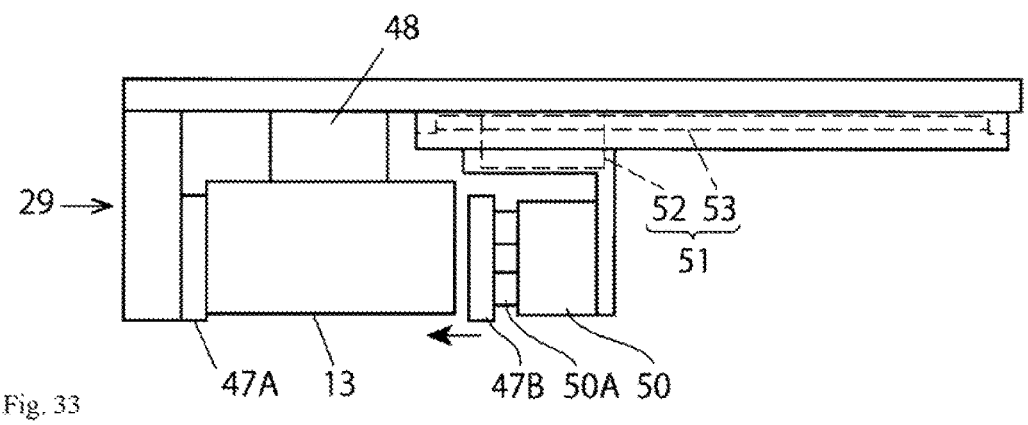
FIG. 32 is a side view illustrating the operation of the workpiece reverse support device in FIG. 28, showing the state that a fluid pressure cylinder is in a second position.
Figure 33:
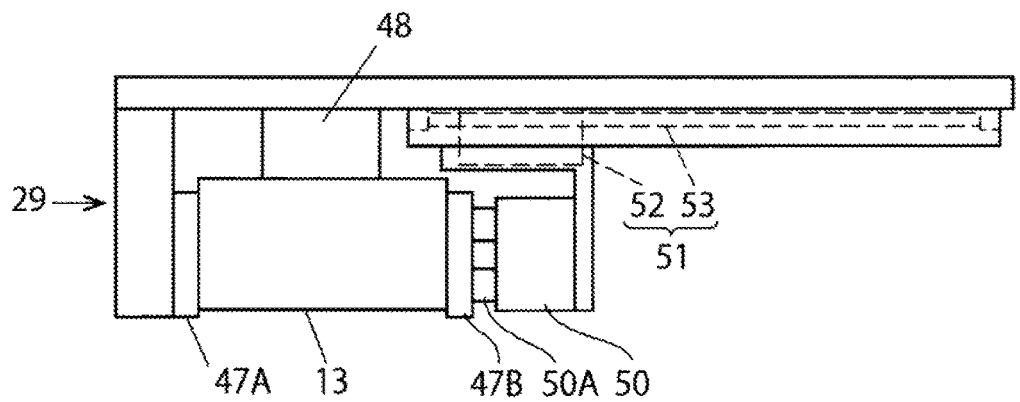
FIG. 33 is a side view illustrating the operation of the workpiece reverse support device in FIG. 28, showing a workpiece pinching state.

The fluid pressure cylinder 50 is moved to the second position as illustrated in FIG. 32 by the cylinder moving unit 51 in the state that the workpiece 13 is abutted on the fixed workpiece pinching member 47A and the ceiling side abutting base 48 by the robot 5. Subsequently, the movable workpiece pinching member 47B is advanced by driving the fluid pressure cylinder 50 so as to pinch and hold the workpiece 13 by the fixed workpiece pinching member 47A and the movable workpiece pinching member 47B as illustrated in FIG. 33.

Next, in the state that the holding state of the workpiece 13 by the workpiece holding unit 32 of the robot 5 is released and the workpiece 13 is temporarily held by the workpiece reverse support device 29, the sucking portion 33 of the workpiece holding unit 32 is abutted on the back surface of the workpiece 13 so as to suckingly hold the workpiece 13 by operating the robot 5 as shown with the virtual line in FIG. 34.

At this time, as the position and direction of the workpiece 13 held by the workpiece reverse support device 29 are previously acquired accurately, the workpiece 13 can be held in the predetermined position by the workpiece holding unit 32 of the robot 6 by operating the robot 5 based on the workpiece position information which has been previously acquired.

Subsequently, the fluid pressure cylinder 50 and the cylinder moving unit 51 are driven so as to release the workpiece 13 from the fixed workpiece pinching member 47A and the movable workpiece pinching member 47B, and the robot 5 is operated so as to take the workpiece 13 out from the workpiece reverse support device 29.

After that, the robot 5 processes the workpiece by the processing device 12 while three-dimensionally handling the workpiece 13.

As the workpiece reverse support device 29 according to the embodiment pinches and holds the workpiece 13 by the pair of workpiece pinching members 47A, 48B as stated above, flexibility of installation state (installation location, installation posture, or the like) of the workpiece reverse support device 29 can be enhanced.

For example, as the workpiece reverse support device 29 according to the embodiment, the installation location can be the ceiling surface of the robot cell 1, and thereby the limited work space 4 in the robot cell 1 can be used effectively.

Especially, as a device which requires a relatively large installation area as the belt-type grinding machines 12A, 12B, 12C is used in the robot cell 1 for implementing grinding process, it is extremely advantageous that the workpiece reverse support device 29 has high flexibility in its installation location for apparatus arrangement design.

Note that it is preferable that the pair of workpiece pinching members 47A, 47B of the workpiece reverse support device 29 pinch the workpiece 13 so that the robot 5 is positioned on a pinching direction axis line A1 of the workpiece 13 (see FIG. 3).

The operation of the robot 5 when the robot 5 have access to the workpiece reverse support device 29 can be symmetric by positioning the robot 5 on the pinching direction axis line A1 of the workpiece 13. Thereby, the operation space of the robot 5 can be ensured easily even in the limited work space 4 in the robot cell 1.

Hereunder, an example of the processes of grinding the workpiece 13 in the above-stated robot cell 1 will be described.

A worker opens the carry-in door in front of the cell skeleton 2 and sets a plurality of trays 14 at vertically spaced intervals to the supply side elevating/lowering portion 15A of the supply side tray elevating/lowering device 10A. A plurality of workpieces 13 to be processed are placed on each tray 14. At this time, the supply side elevating/lowering portion 15A is arranged at the lowermost position.

Next, the worker closes the carry-in door 16, inputs a workpiece type and quantity via the operation panel 19, and presses the start button. Then, the robot 5 selects the robot hand 8 for a selected workpiece from a plurality of robot hands 8 on the hand placing table 9 and chucks the same.

On the other hand, the supply side tray elevating/lowering device 10A elevates the supply side elevating/lowering portion 15A so as to move the uppermost tray 14 to a predetermined workpiece acquiring position, namely the position of the supply side opening 30A.

The robot 5 sucks one of the plurality of workpieces 13 stored in the tray 14 on the supply side by the sucking portion 33 of the workpiece holding unit 32 so as to take the same out, and positions the workpiece 13 according to the above-stated positioning operation of the workpiece positioning unit 34.

The robot 5 conveys the workpiece 13 held by the workpiece holding unit 32 of the robot hand 8 to the workpiece reverse support device 29 installed on the ceiling 2B of the cell skeleton 2 and makes the workpiece reverse support device 29 hold the workpiece 13 temporarily.

The robot 5 abuts the sucking portion 33 of the workpiece holding unit 32 on the back surface of the workpiece 13 held by the workpiece reverse support device 29 so as to suck the same. Thereby, the workpiece 13 is reversed face/back in the robot hand 8 so as to be reheld.

Next, the robot 5 carries out a predetermined grinding process on the workpiece 13 using the processing device 12 and properly blows the grinding powder adhered on the workpiece 13 during grinding by the air from the air blow nozzle 28 so as to finish the grinding processing.

The workpiece 13 which has finished grinding process is conveyed to the workpiece reverse support device 29 by the robot 5 so as to be reversed again. The robot 5 reholds the workpiece 13 using the workpiece reverse support device 29, and after that the robot 5 stores the workpiece 13 in the discharge side tray 14 placed on the discharge side elevating/lowering portion 15B of the discharge side tray elevating/lowering device 10B.

Repeating the above-stated series of operations, for all of the plurality of workpieces 13 stored in the uppermost supply side tray 14, their respective grinding processes are carried out. The tray 14 on the discharge side in which the processed workpiece 13 is stored is lowered by the discharge side tray elevating/lowering device 10B by only one stage.

The robot 5 suckingly holds the empty supply side tray 14 by the workpiece holding unit 32 and places the same on the tray 14 on the discharge side in which the processed workpieces 13 are stored. The supply side tray elevating/lowering device 10A elevates the supply side elevating/lowering portion 15A by only one stage so as to arrange the next tray 14 in which the plurality of workpieces 13 to be processed are stored to a predetermined workpiece acquiring position, namely the supply side opening 30A formed on the horizontal work table 3.

Repeating the above-stated operations, after finishing the grinding process on the workpieces 13 in all the trays 14 set on the supply side elevating/lowering portion 15A, the worker opens the carry-out door 17 so as to carry the discharge side tray 14 out from the inside of the robot cell 1.

According to the operations above, processes, specifically grinding processes on the plurality of workpieces 13 stored in the plurality of trays 14 are finished.

REFERENCE SIGNS LIST

1 . . . robot cell
2 . . . cell skeleton
2A . . . side wall of cell skeleton
2B . . . ceiling of cell skeleton
2C . . . bottom wall of cell skeleton
3 . . . horizontal work table
4 . . . work space
5 . . . robot
6 . . . base portion of robot
7 . . . robot arm
8 . . . robot hand
9 . . . hand placing table
10A, 10B . . . tray elevating/lowering device
11 . . . control device
12 . . . processing device
12A, 12B, 12C . . . belt-type grinding machine
12D . . . electric precision grinder
12E . . . grinding brush
13 . . . workpiece
14 . . . tray
15A, 15B . . . elevating portion of tray elevating/lowering device
16 . . . carry-in door
17 . . . carry-out door
18A, 18B . . . work door
19 . . . operation panel
20A, 20B, 20C . . . grinding belt (processing surface)
21 . . . grinding surface (processing surface) of grinding brush
22 . . . drive motor
23 . . . rotational grinding member
24 . . . grinding surface (processing surface) of rotational grinding member
25 . . . suction duct for electric precision grinder
26 . . . LM guide for electric precision grinder
27 . . . rebounding unit for electric precision grinder (air cylinder)
28 . . . air blow nozzle
29 . . . workpiece reverse support device
30A . . . supply side opening
30B . . . discharge side opening
31 . . . hand base portion
32 . . . workpiece holding unit
33 . . . sucking portion
34 . . . workpiece positioning unit 35 . . . positioning abutting member
36A . . . positioning abutting piece for long-side
36B . . . positioning abutting piece for short-side
37 . . . workpiece holding surface
38 . . . forward/backward position switching unit
39 . . . air cylinder for forward/backward operation
39A . . . piston of air cylinder for forward/backward operation
40 . . . abutting piece supporting member
41 . . . cylinder supporting member
42 . . . first LM guide
43 . . . first drive source
44 . . . second LM guide
45 . . . second drive source
46 . . . vacuum source
47, 47B . . . workpiece pinching member
48 . . . ceiling side abutting base
49 . . . workpiece pinching member drive unit
50 . . . fluid pressure cylinder
50A . . . piston of fluid pressure cylinder
51 . . . cylinder moving unit
52 . . . travelling member of cylinder moving unit
53 . . . LM guide of cylinder moving unit
54 . . . drive source for travelling of cylinder moving unit
55 . . . pinching state switching unit
A1 . . . workpiece pinching direction axis line of workpiece reverse support device
D1 . . . workpiece long side extending direction (first inner/outer direction)
D2 . . . workpiece short side extending direction (second inner/outer direction)
D3 . . . forward/backward direction

The invention claimed is:

1. A workpiece reverse support device for supporting a face to back reverse operation of a workpiece to be held by a robot hand, comprising:
   a pair of workpiece pinching members for abutting on their respective opposing side portions of the workpiece held by the robot hand so as to pinch the workpiece, the pair of workpiece pinching members comprising
      a stationary workpiece pinching member fixed to the ceiling surface of the robot cell in a static position, and
      a movable workpiece pinching member; and
   a pinching state switching unit comprising
      a pinching member driver configured to move the movable workpiece pinching member in a linear direction for switching the pair of workpiece pinching members between a pinching state of pinching the workpiece and a releasing state of releasing the workpiece,
      a linear motion guide fixed directly to the ceiling, and
      a travelling member supported by the linear motion guide, the travelling member configured to move the pinching member driver and the movable workpiece pinching member in the linear direction along the linear motion guide, wherein
   the workpiece reverse support device is configured such that the robot hand is provided separately from the workpiece reverse support device,
   the workpiece reverse support device is installed inside of a robot cell in which a robot having the robot hand is arranged, and
   the pair of workpiece pinching members pinch the workpiece so that the workpiece is substantially orthogonal to a ceiling surface of the robot cell.

2. The workpiece reverse support device according to claim 1, wherein the pair of workpiece pinching members pinch the workpiece so that the robot is positioned on a pinching direction axis line of the workpiece.

3. The workpiece reverse support device according to claim 1, wherein the pinching member driver has a fluid pressure cylinder including a piston on which the movable workpiece pinching member is mounted.

4. A robot cell for processing a workpiece, comprising:
   the workpiece reverse support device according to claim 1; and
   a cell skeleton inside which the workpiece reverse support device is installed.

* * * * *